(12) United States Patent
Gebauer et al.

(10) Patent No.: US 10,888,799 B2
(45) Date of Patent: Jan. 12, 2021

(54) VALVE MANIFOLDS FOR SIMULATED MOVING BED CHROMATOGRAPHY

(71) Applicant: Cytiva Sweden AB, Uppsala (SE)

(72) Inventors: Klaus Gebauer, Uppsala (SE); Bjorn Markus Olovsson, Uppsala (SE)

(73) Assignee: Cytiva Sweden AB, Uppsala (SE)

( * ) Notice: Subject to any disclaimer, the term of this patent is extended or adjusted under 35 U.S.C. 154(b) by 526 days.

(21) Appl. No.: 15/534,540

(22) PCT Filed: Dec. 23, 2015

(86) PCT No.: PCT/EP2015/081179
§ 371 (c)(1),
(2) Date: Jun. 9, 2017

(87) PCT Pub. No.: WO2016/107809
PCT Pub. Date: Jul. 7, 2016

(65) Prior Publication Data
US 2017/0361245 A1    Dec. 21, 2017

Related U.S. Application Data

(60) Provisional application No. 62/098,605, filed on Dec. 31, 2014.

(51) Int. Cl.
*B01D 15/18*    (2006.01)
*G01N 30/20*    (2006.01)
(Continued)

(52) U.S. Cl.
CPC ......... *B01D 15/1842* (2013.01); *G01N 30/20* (2013.01); *G01N 30/461* (2013.01);
(Continued)

(58) Field of Classification Search
CPC ............... B01D 15/14; B01D 15/1821; B01D 15/1842; B01D 15/1864; B01D 15/1885;
(Continued)

(56) References Cited

U.S. PATENT DOCUMENTS 7,141,172 B2    11/2006    Wang et al.
7,141,742 B2    11/2006    Barr et al.
(Continued)

FOREIGN PATENT DOCUMENTS

CN    101732890 A    6/2010
JP    H0634614 A     2/1994

OTHER PUBLICATIONS

PCT International Search Report and Written Opinion for PCT Application No. PCT/EP2015/081179 dated Apr. 18, 2016 (11 pages).

(Continued)

*Primary Examiner* — Benjamin L Lebron
(74) *Attorney, Agent, or Firm* — Eversheds Sutherland (US) LLP

(57) ABSTRACT

Disclosed is a device for chromatographic separations comprising: a manifold comprising a manifold body defining an elongate central duct, the central duct comprising a centrally-located closable duct valve providing selective fluid communication between a first portion of the central duct and an opposed second portion of the central duct, a first plurality of connectors, each connector of the first plurality of connectors for connecting to a distinct chromatographic separation column and/or feed or extraction tubing or to a connector of an adjacent manifold; a second plurality of connectors, each connector of the second plurality of connectors for connecting to a distinct chromatographic separation column and/or feed or extraction tubing or to a connector of an adjacent manifold; wherein said manifold body further defines: a first plurality of branch ducts, each branch duct of which extending from the first portion of the central duct to an individual one of the first plurality of connectors, each of the branch ducts of the first plurality of branch ducts comprising a closable branch valve providing selectable fluid communication between a respective con- (Continued)

nector and the first portion of the central duct, a second plurality of branch ducts, each branch duct of which extending from the second portion of the central duct to an individual one of the second plurality of connectors, each of the branch ducts of the second plurality of branch ducts comprising a closable branch valve providing selectable fluid communication between a respective connector and the second portion of the central duct; first and second ports in fluid communication with the centrally-located closable duct valve wherein said first port communicates with said first portion of the central duct and said second port communicates with said second portion of said central duct, wherein one of said first and second ports is further positioned to communicate with said central duct at a location between the centrally-located closable duct valve and the first and second plurality of branch ducts, respectively.

16 Claims, 15 Drawing Sheets

(51) Int. Cl.
    *G01N 30/42*     (2006.01)
    *G01N 30/46*     (2006.01)
    *G01N 30/88*     (2006.01)

(52) U.S. Cl.
    CPC ......... *G01N 30/466* (2013.01); *G01N 30/467* (2013.01); *G01N 30/88* (2013.01); *G01N 30/42* (2013.01); *G01N 30/468* (2013.01); *G01N 2030/205* (2013.01); *G01N 2030/8881* (2013.01)

(58) Field of Classification Search
    CPC ........ G01N 30/20; G01N 30/88; G01N 30/42; G01N 30/461; G01N 30/466; G01N 30/467; G01N 30/468; G01N 30/6034; G01N 2030/205; G01N 2030/8881
    See application file for complete search history.

(56) References Cited

U.S. PATENT DOCUMENTS

| | | |
|---|---|---|
| 7,846,335 B2 | 12/2010 | Bisschops et al. |
| 9,012,212 B2 | 4/2015 | Bisschops et al. |
| 2009/0242486 A1 | 10/2009 | Dapremont |
| 2013/0260419 A1 | 10/2013 | Ransohoff et al. |

OTHER PUBLICATIONS

Japanese Office Action for JP Application No. 2017-535353 dated Aug. 30, 2019 (9 pages with English translation).
European Search Report for EP Application No. 19186288.7 dated Nov. 29, 2019 (7 pages).
Japanese Office Action for JP Application No. 2017-535353 dated May 25, 2020 (5 pages).

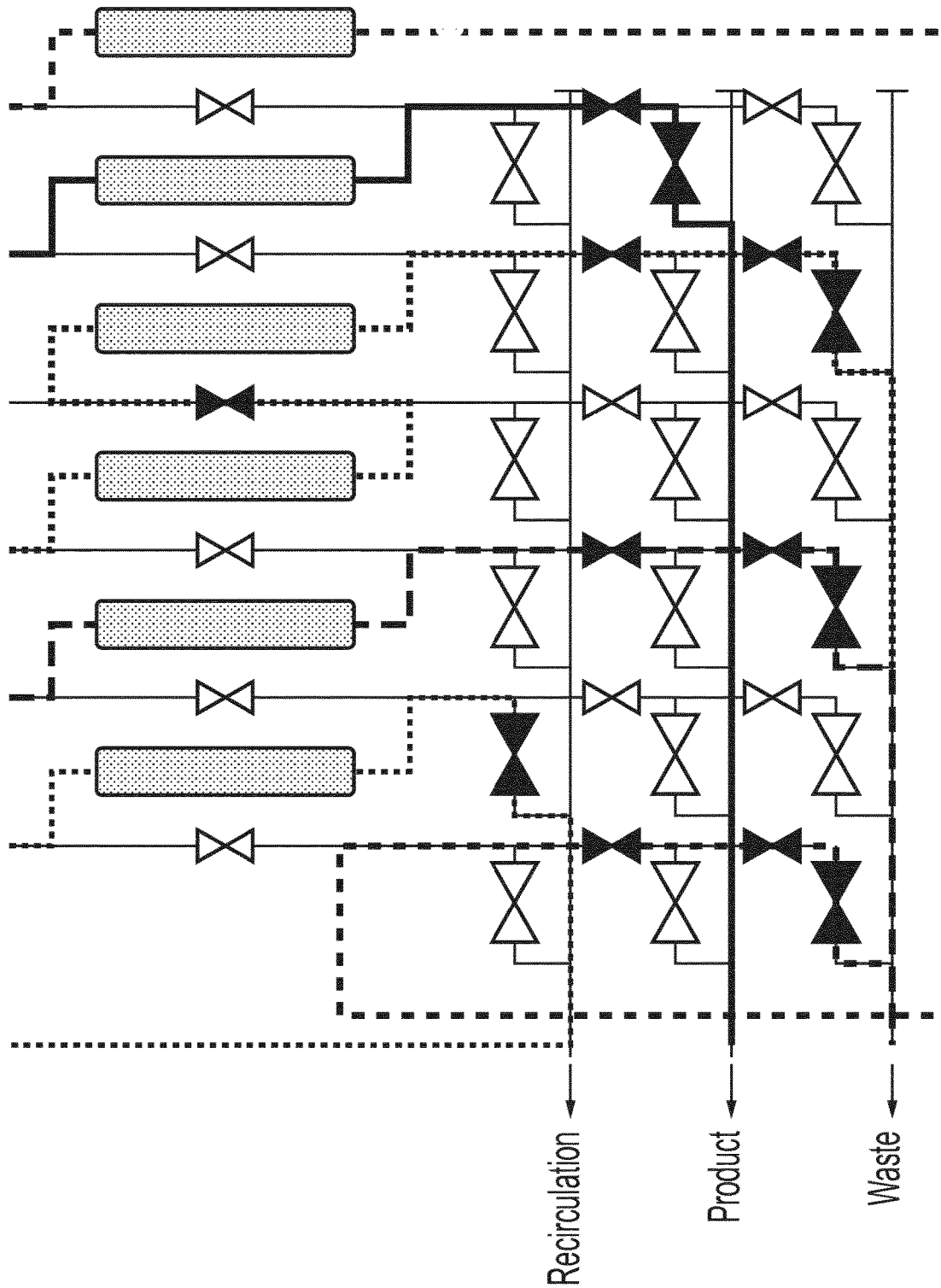

VALVE MANIFOLDS FOR SIMULATED MOVING BED CHROMATOGRAPHY

CROSS REFERENCE TO RELATED APPLICATIONS

This application claims the priority benefit of PCT/EP2015/081179 filed on Dec. 23, 2015 which claims priority benefit of U.S. Provisional Patent Application No. 62/098,605 filed Dec. 31, 2014. The entire contents of which are hereby incorporated by reference herein.

FIELD OF THE INVENTION

The present invention relates to a device for chromatographic separations. In particular, the invention relates to a modular chromatography system for single or multiple columns that is suitable for purification of biopharmaceutical products.

BACKGROUND OF THE INVENTION

Chromatography is one of the most important methods for the purification of biotechnological and biopharmaceutical products. This can be based on ion exchange chromatography, affinity chromatography, size exclusion (or gel filtration) chromatography, hydrophobic interaction chromatography or reversed phase chromatography among others.

Traditionally, chromatographic purifications have been carried out in batch mode. This involves one single column that is subsequently loaded, washed, eluted, etc. For treating large volumes or purifying large amounts of product, either very large columns are needed or repeated injections are required. This yields a relatively inefficient mode of operation with a low specific productivity. Such chromatography processes require large amounts of Adsorbent and large amounts of buffers.

Continuous processes are known to have a higher specific productivity and—if carried out in a countercurrent mode—consume much lower amounts of buffer. Continuous countercurrent chromatography processes are generally based on multiple columns. This includes the traditional merry-go-round system, carrousel type systems and static type SMB systems.

Such SMB (Simulated Moving Bed) systems generally use a series of columns with periodically moving inlet and outlet ports. These techniques have been successfully used in the production of petrochemicals and sugars. However, biopharmaceutical production is still based on batch processes. Nonetheless, also batch processes can involve steps that are essentially carried out in a continuous mode. For instance, centrifugation is often performed as a continuous process. In some processes even continuous perfusion systems for the cell culture or fermentation process are being used. SMB technology can also be used for elution chromatography, which involves binding and eluting components under different conditions.

In order to avoid the cleaning of equipment, biopharmaceutical production processes nowadays use wetted components that are for single-use or that are dedicated to one process step of one single product. This cuts down the requirement for cleaning dramatically. In case of single-use wetted components, cleaning can be even completely avoided. The use of single-use bags for storing buffers and intermediate products instead of containers is one very successful example of single-use components in biopharmaceutical industries. In processing relatively small batches, it is also common to use disposable bioreactors, disposable membrane cartridges and tubing.

Existing multicolumn chromatography systems involve complex valve arrangements in order to ensure proper distribution of all flows to all columns. For biotechnology this is undesirable because of the cleaning issues involved. The cleaning of a system in biopharmaceutical production processes should be designed such that it ensures removal of all contaminating compounds from all potentially wetted surfaces. In this respect, equipment with complex internal geometries is very difficult to clean.

Chin and Wang, in "Simulated Moving Bed Equipment Designs", Separation And Purification Reviews, Vo 33. No 2, pp 77-155, 2004, give some requirements for a truly versatile SMB system, which includes the possibility of performing zone bypasses and allowing configurations in which the number of zones ranges from three to nine or more, allowing easy changes in the configuration. Additionally, as shown in FIG. 1, U.S. Pat. No. 7,141,172 to Wang discloses a versatile SMB system 10 having an arrangement of conduits and valves identified within box 12. As shown in FIG. 1, the Wang system of FIG. 1 may be serially-connected between successive columns.

Manifold units are known means for providing organized flowpaths for fluids. For example, the FASTlab synthesis system sold by GE Healthcare of Liege, Belgium, provides a disposable manifold body (shown in FIG. 2) incorporating linearly-aligned three-way valves connecting between a variety of conduits, supply reservoirs, pumps, separations columns, and a reaction chamber for synthesizing various radiopharmaceutical solutions. Additionally, U.S. Patent Application No. 20050092662 of Gilbert et al discloses a planar valve manifold chip, the chip is formed from multiple overlaying substrates which cooperatively define fluid flow paths and provide for membrane valves to be actuated for opening or closing certain fluid flow paths as desired.

Moreover, as shown in FIG. 3, U.S. Pat. No. 7,846,335 to Bisschops discloses a disposable planar manifold 40 for SMB which utilizes the valve and conduit arrangement of Wang. The Bisschops SMB manifold may be serially-connected between successive columns or manifolds as desired. However, the serial connection nature of the Bisschops manifold design necessitates potentially long stretches of conduit for collecting holdup volumes of potentially valuable material fluid. That is, due to the physical length/height of the serial arrangement and the fact that the column connections are on opposite side of the manifolds, the Bishops manifold requires a minimum length of connection tubing to the inlet and outlet connections of the packed bed and chromatography column. In SMB, however the columns and bed heights are very short, therefore, the required tubing length gives unfavorable extra holdup volume.

The art therefore lacks a manifold design for SMB applications which reduces potential hold-up volume.

SUMMARY OF THE INVENTION

In one aspect of the present invention, it is desirable to provide a valve device that is flexible in the number of connections that can be made. In another aspect of the invention it is desirable to provide a valve device that limits contamination by using a specific structure. The system is also suitable for traditional single-column chromatography processes.

In another aspect of the present invention a device for chromatographic separations is provided comprising a manifold comprising a plurality of connectors for connecting to one or more chromatographic separation columns and/or feed or extraction tubing, or even to a mating connector on another manifold. A central duct includes a closable central duct valve. The central duct is divided by the central duct valve into a first portion, or segment, and a second portion, or segment. The first portion extends to either side of at least one inlet (or outlet) port. The second portion is in fluid communication with a second inlet (or outlet) port which is positioned opposite the central valve to the first port. In addition, a first plurality of branch ducts branching from the first portion of the central duct to a first plurality of branch connectors while a second plurality of branch ducts branching from the second portion of the central duct to a second plurality of branch connectors are provided. The branch ducts each include a closable branch valve. At least one of the inlet ports is positioned between the central valve and one of the plurality of branch ducts while the other inlet port is either positioned (a) between the central valve and the other plurality of branch ducts or (b) opposite both the central valve and the other plurality of branch ducts from the first inlet port. The manifold of the present invention may be incorporated into a system for performing an SMB process.

Alternatively, the present invention provides the device for chromatographic separations in which the branch ducts are arranged in transversely-aligned pairs which extend out to each side of the manifold body. Each of the aligned pairs of branch ducts thus forms a single through-duct that is connected to the central duct by a single branch duct having an access valve therein to control flow from the through-duct to the central duct and thus provide selectable fluid communication between the opposed connector ports of each through-duct with the central duct. Alternatively still, each of the through-ducts may include a branch valve so as to control flow from one through duct to an aligned and connected through-duct on another manifold. The provision of the branch valve in addition to the access valve assists in further minimizing dead-space in an array of connected manifolds. In another embodiment of the present invention, the manifold may provide a series of central duct valves positioned between successive branch ducts.

DETAILED DESCRIPTION OF THE PREFERRED EMBODIMENTS

Definitions

Figure 3:
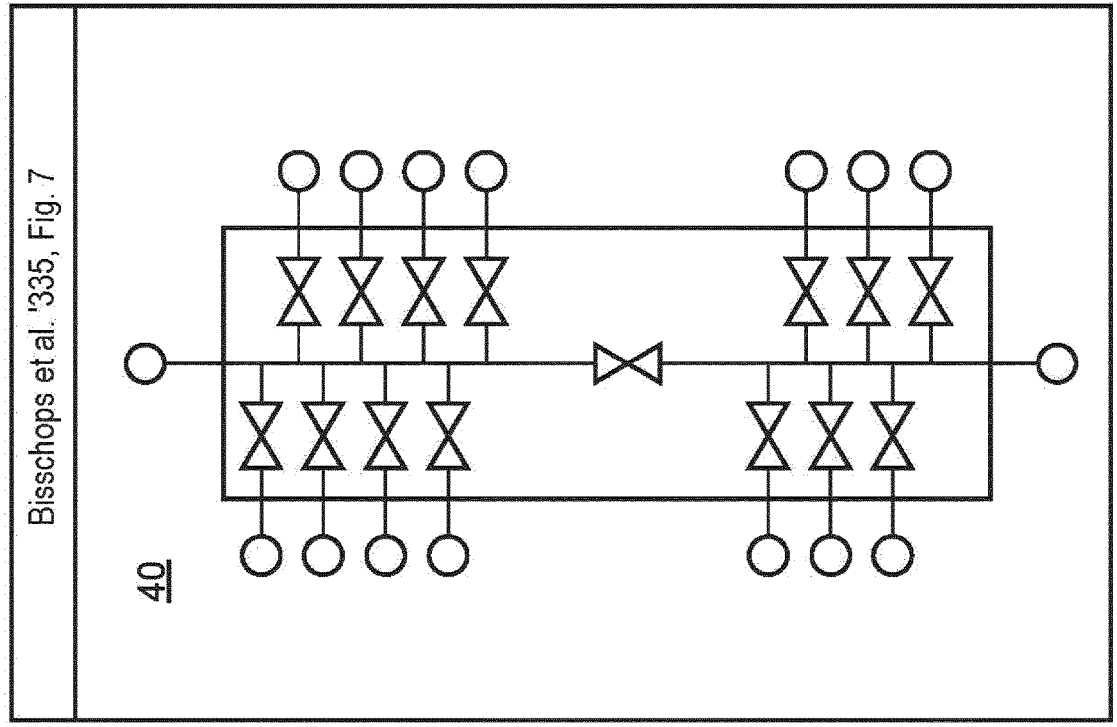
FIG. 3 shows a disposable manifold of Bisschops incorporating the flowpath design of Wang.
Figure 1:
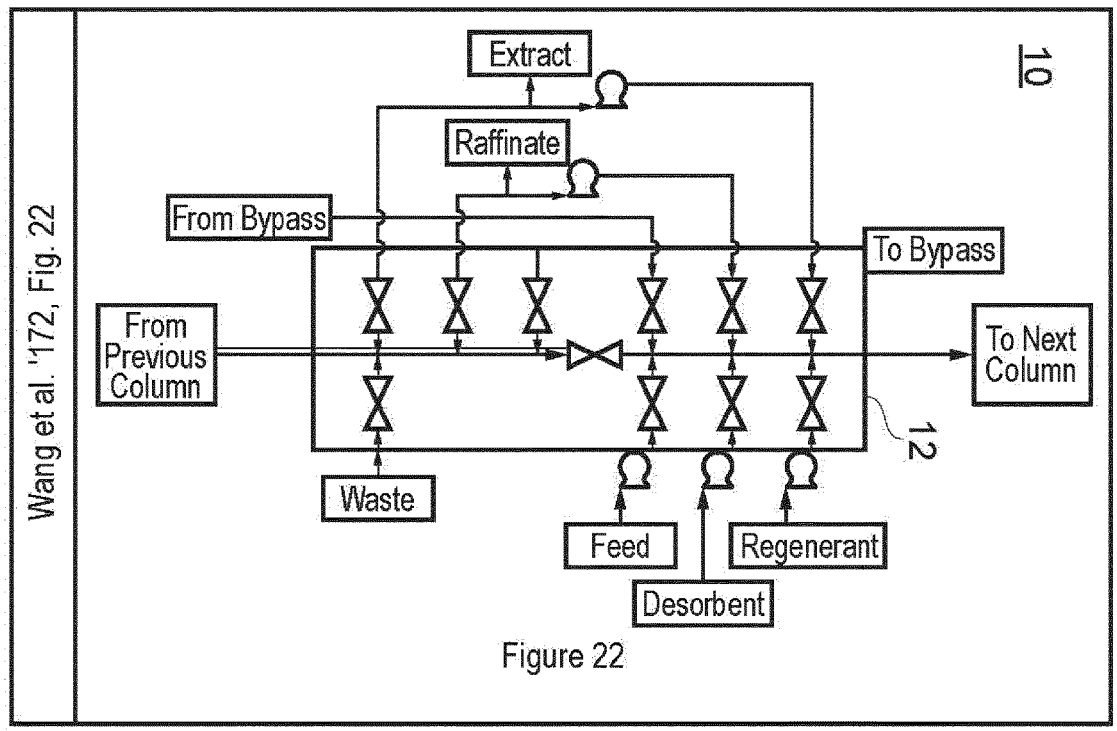
FIG. 1 shows the flowpath incorporating valves and conduits according to Wang.
Figure 2:
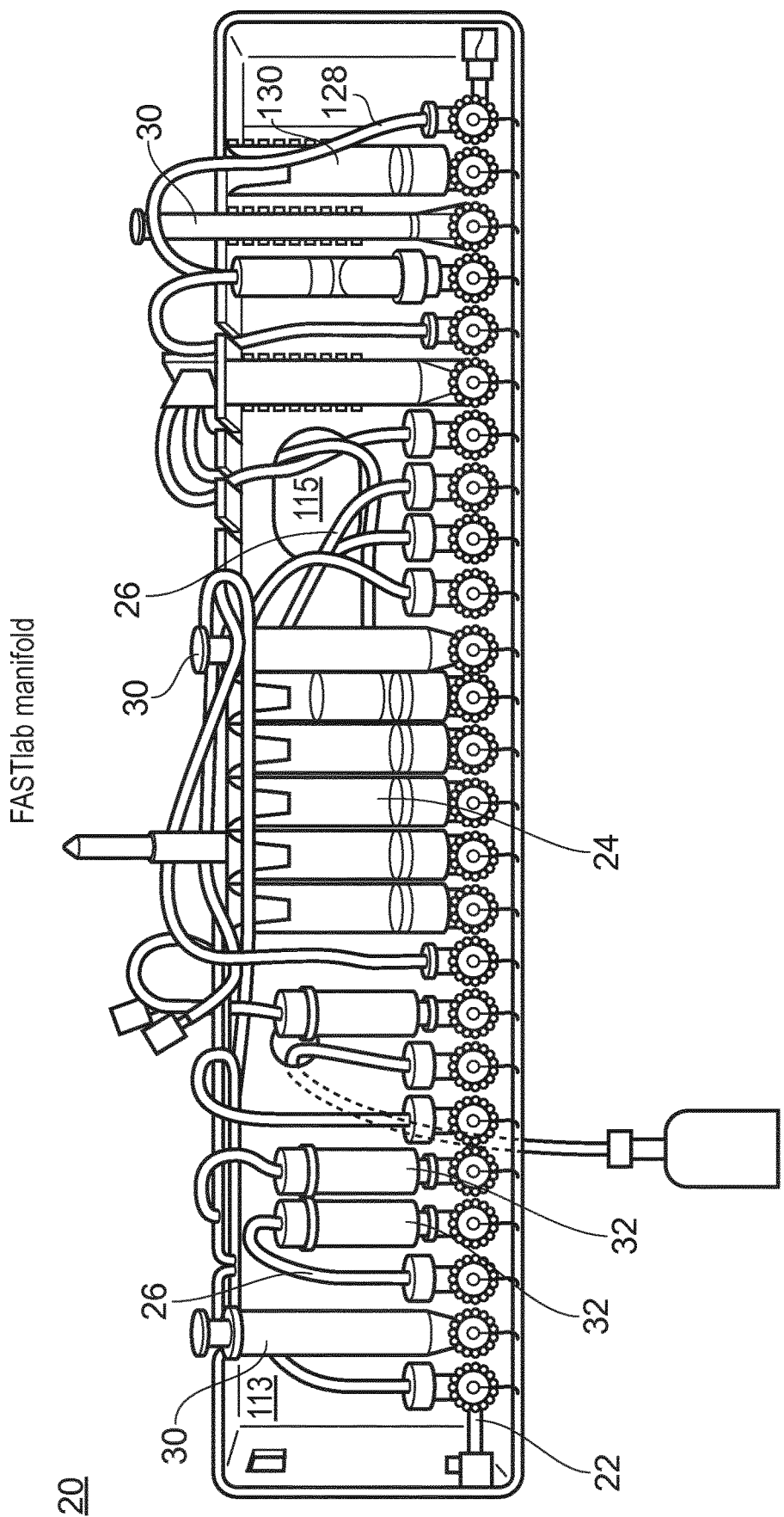
FIG. 2 shows a disposable manifold used for radiopharmaceutical synthesis.

In this document, the following terms shall have the following meanings:

Continuous Multicolumn Chromatography: Continuous Multicolumn Chromatography is a method in which multiple chromatography columns are interconnected to allow continuous operation with respect to the feed solution. This includes among others Simulated Moving Bed chromatography and Merry-Go-Round approaches.

Adsorbent: The Adsorbent is the stationary phase in the chromatography process. Commonly, this comprises particles, but it may also be a structured packing (e.g. a functionalized membrane or a monolithic structure). The Adsorbent normally comprises a matrix (silica, polymeric, polysaccharides, etc.) and may be functionalized (e.g. in case of ion exchange or affinity chromatography). In the case of a particulate Adsorbent, the Adsorbent may be in a packed bed or may be fluidized during the operation.

Column: A column is a single module that contains Adsorbent. In the case of a particulate Adsorbent, the Adsorbent may be in a packed bed or may be fluidized during the operation.

Zone: One or more columns connected in parallel and/or in series, where each column is essentially subjected to the same flow rate and where no intermediate inlet and outlet ports to and from the zone are present.

Purification: The process in which either the product of interest is isolated from its environment, for instance by binding it to an Adsorbent, or in which contaminants are removed from the environment of the product of interest.

Biopharmaceuticals: Pharmaceutical products that are produced through biotechnological processes. This includes all recombinant proteins, (monoclonal) antibodies, vaccines, blood/plasma-derived products, non-recombinant culture-derived proteins, and cultured cells and tissues.

Fractionating chromatography: The separation is based on a difference in propagation velocity through the bed. This is commonly caused by differences in affinity for the Adsorbent. In the case of, for instance, size exclusion media, the difference in propagation velocity is caused by the fact that smaller molecules can penetrate the media more easily than larger molecules and are thus retained. Examples of this type of chromatography are size exclusion, ion exclusion, reversed phase chromatography and hydrophobic interaction chromatography.

Elution chromatography: Elution chromatography is the mode of operation where the Adsorbent is subsequently loaded and eluted. Normally, this type of operation involves one or multiple wash steps in the process cycle and in some cases there may even be a regeneration, cleaning and/or equilibration step. The separation is based on the selective adsorption of one or more components from solution, while other components are essentially not retained and move through the column. This mode of chromatography includes—for instance—ion exchange and affinity chromatography. The most common affinity chromatography media in the purification of biopharmaceuticals are based on protein A. Nonetheless, a wide variety of other affinity ligands are commercially available or are currently being developed, such as Immobilized Metal Affinity Chromatography (IMAC), heparin, lectin, triazine dyes, etcetera.

Single-use: Modules, parts, instruments or components are single-use in case they are disposed after a production batch has been terminated or finished. Single-use components are often referred to as disposable components. A well-known example of single-use components are plastic bags to store buffers, solutions or intermediate products instead of rigid containers, such as supplied by Stedim S. A. (Aubagne, France). Other examples are membrane cartridges, such as supplied by Pall (East Hills, N.Y.) or Millipore (Bedford, Mass.).

Dedicated-use: Modules, parts, instruments or components are for dedicated-use in case their application is limited to the purification of one single product. This may involve multiple batches and/or multiple production campaigns.

The present invention provides a manifold valve block for SMB chromatography applications having a versatile and cost-efficient design which shortens the tubing length, and thus the hold-up volume. The present invention is also suitable for single-use applications.

Aspects of the invention are paraphrased in the following clauses: A modular chromatography system utilizes pumps, columns and valve manifolds, arranged in such a way that it allows purification of a biopharmaceutical from a feed mixture. The valve manifold organizes valves necessary for the chromatography process. The wetted parts of the valve manifold are designed for single-use or for dedicated use. A modular chromatography system may include one single pump, one single column and one single manifold, arranged in such a way that it allows single-column chromatographic purification of a biopharmaceutical product from a feed mixture. The central valve will remain closed during operation, while the other valves are operated in such a way that all relevant fluids are applied on the column in the appropriate order. The central valve will be opened to achieve a serial connection in between columns. There will be always at least one serial connection between two columns in a loading cycle, as this is the basic concept of the SMB. During rinsing and/or cleaning, the central valve may be opened. A chromatography system may incorporate two separate manifolds of the present invention, with the outlet port of one connected to the inlet port of the other. An essentially continuous purification process with a system of the present invention, in which multiple essentially identical columns carrying a suitable Adsorbent may thus be provided. Such process involves simultaneously conducting at least two of the following steps: loading, washing, eluting, regenerating and equilibrating one or more of the columns. An essentially continuous purification process with a system of the present invention, in which multiple essentially identical columns carrying a suitable Adsorbent is also contemplated. Such process may involve continuous fractionation of the feed solution into at least two outlet streams, at least one of each containing essentially purified product. A purification process having multiple chromatographic separations, more than one of which is carried out in a system of the present invention is further contemplated where the system comprises different columns, at least one for each individual chromatography step involved, each filled with a suitable Adsorbent for that particular step.

Additionally, the present invention provides a valve manifold with multiple inlets and outlets for single-use or dedicated-use, where: a. One inlet port can be connected to the exit of a chromatography column; b. One outlet port can be connected to the inlet of a next chromatography column or to the inlet of the same chromatography column; c. At least two, desirably more inlets through which solutions can be transferred into the column mentioned under (b); d. At least two, desirably more outlets can be connected to tanks to collect effluents from the column mentioned under (a); e. Diaphragm valves can be connect the system inlets mentioned under (c) to the inlet of the column mentioned under (b), and the outlets mentioned under (d) to the outlet of the column mentioned under (a); f. Actuators can open or close the diaphragm valves mentioned under (e); in such a way that all parts except that the actuators mentioned under (f) are single-use or for dedicated-use. The present invention also provides a valve manifold as described previously in which the diaphragm and conducts are organized in one single piece as well as a valve manifold as described previously in which the diaphragm and conducts are organized in two separate pieces, one carrying the conducts and a second part being or carrying the diaphragm. Alternatively, the present invention provides a valve manifold as described previously in which the mentioned inlet and outlet ports pass through the manifold in such a way that manifolds can be connected in parallel, with the connector ports of each manifold connected in fluid communication with an associated connector port on an adjacent manifold. Fluids would desirably be provided through the open (or accessible) connector ports on an end manifold while the open (or accessible) connector ports of the opposing manifold are sealed. It is contemplated that the valve manifolds of the present invention may be assembled in one single piece or organized in two separate pieces, one carrying the ducts and a second part being or carrying the diaphragm for the valves.

According to the present invention, the system comprises one or more columns, at least one of which is connected to a valve manifold at an inlet port. System inlet ports, or connector ports, may be connected to a pump capable of transferring any of the fluids involved into the chromatography process. Alternatively, a system outlet can be connected to the inlet of a subsequent step in the purification process, such as another chromatography step. For convenience, additional monitors may be connected to the inlet and outlet port and/or connector ports to allow monitoring of relevant process conditions, including (but not limited to) pressure, conductivity, pH or UV absorbance.

Although the valve device can be construed in a variety of ways, in one aspect, the valve device according to the present invention desirably comprise two or three separate construction parts as is known for planar valve manifolds. For example, the network of fluid flowpaths may be defined between two planar substrates, one or both of the substrates may define a number of ports in fluid communication with the fluid flowpath network, and a number of valves may be provided at different portions of the flowpath network so as to allow or prevent fluid flow through that respective portion.

Figure 4:
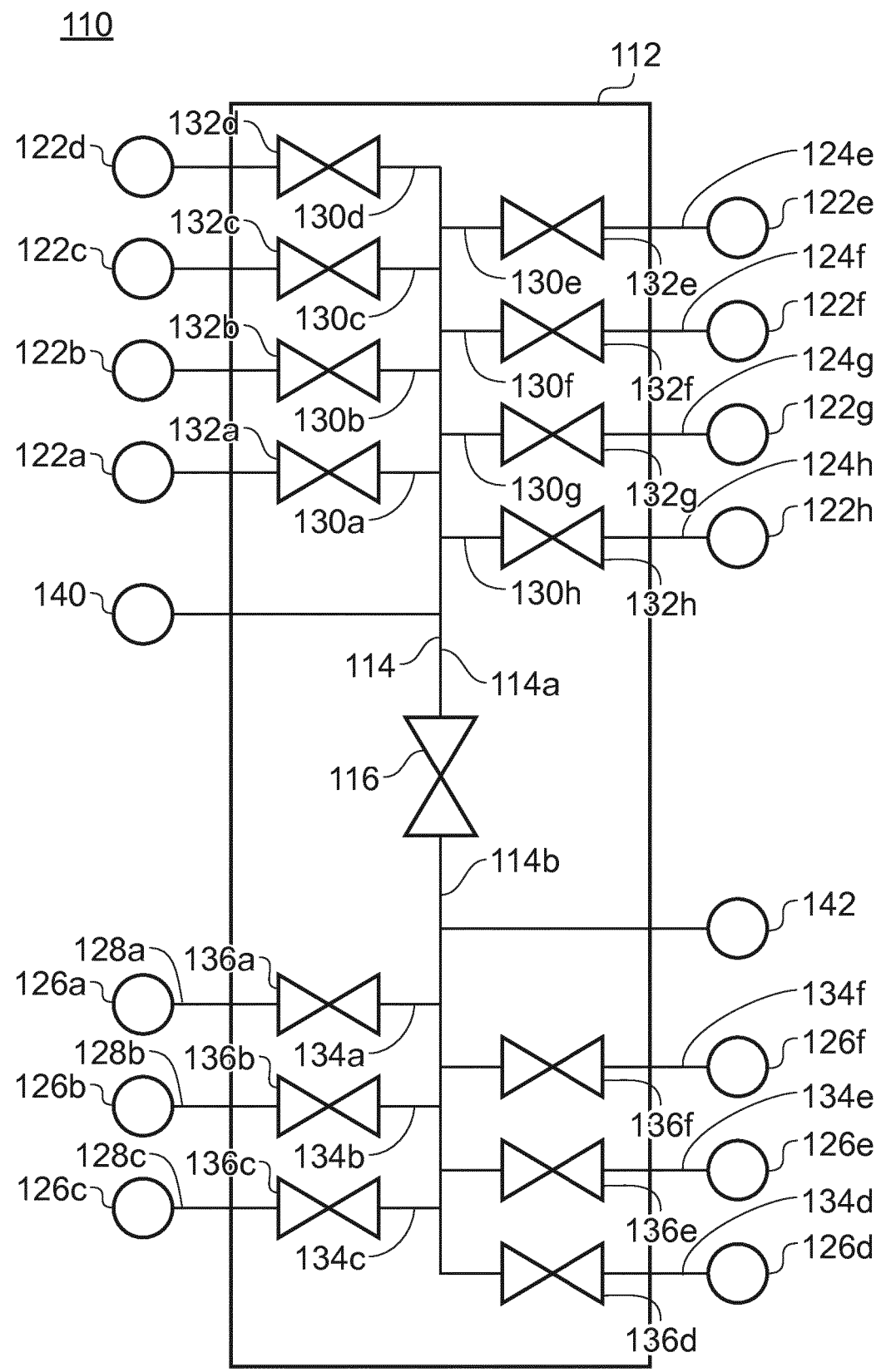
FIG. 4 depicts a first manifold of the present invention.

Referring to FIG. 4, the present invention provides a valve manifold 110 having a valve body 112 defining a network of flowpaths and incorporating a plurality of valves for selectively isolotating portions of the flowpath network as required. Manifold body 112 defines an elongate central duct 114 including a centrally-located closable duct valve 116 providing selective fluid communication between a first portion 114a of central duct 114 and an opposed second portion 114b of central duct 114. Manifold 110 further includes a first plurality of connectors 122a-h, each of connectors 122a-h being connectable to a distinct chromatographic separation column and/or feed or extraction tubing, or other device useful for a particular process. Connectors 122*a-h* are contemplated to be provided directly on manifold body 112 or may be connected to manifold body 112 at a connector port 124*a-h*, respectively, defined by manifold body 112. Manifold 110 also includes a second plurality of connectors 126*a-d*, each of connectors 126*a-d* being connectable to a distinct chromatographic separation column and/or feed or extraction tubing, or other device useful for a particular process. Connectors 126*a-d* are contemplated to be provided directly on manifold body 112 or may be connected to manifold body 112 at a connector port 128*a-d*, respectively, defined by manifold body 112. Typically, the connectors can be of any type, and are desirably of a sanitary type such as a connector known in the art as a tri-clover connector. Although the schematic drawing depicts the connectors as protruding elements, alternatively, the connectors can be of a male-female type. Yet as another alternative, the connectors can be of a gasket type. Connectors 122*a-d* and 126*a-c* may also be connected to the connectors 124*e-h* and 126*d-f*, respectively, of an adjacent manifold 110 (alternative systems of the present invention demonstrating such connectability is shown and discussed for FIGS. 12-14).

Manifold body 112 further defines a first plurality of branch ducts 130*a-h*, each of which extends from the first portion 114*a* of central duct 114 to an individual one of the first plurality of connectors 122*a-h*, respectively. Each of branch ducts 130*a-h* includes a closable branch valve 132*a-h* providing selectable fluid communication between a respective connector 122*a-h* and first portion 114*a* of central duct 114. Similarly, manifold body defines a second plurality of branch ducts 134*a-d*, each of which extends from the second portion 114*b* of central duct 114 to an individual one of the second plurality of connectors 126*a-d*, respectively. Each of branch ducts 134*a-h* includes a closable branch valve 136*a-d* provide selectable fluid communication between a respective connector 126*a-d* and second portion 114*b* of central duct 114.

Manifold body 112 also defines a first port 140 in fluid communication with central duct 114. First port 140 is positioned to be in fluid communication with the first portion 114*a* between the duct valve 116 and the first plurality of branch ducts 130*a-h*. Manifold body 112 defines a second port 142 in fluid communication central duct 114, such that second port 142 communicates with portion 114*b* of central duct 114 at a position opposite duct valve 116 from that where first port 140 communicates with central duct 114. FIG. 4 depicts first port 140 positioned between duct valve 116 and branch ducts 130*a-h* while second port 142 is positioned between duct valve 116 and branch ducts 134*a-d*. The present invention contemplates that either first port 140 or second port 142 may be used as an inlet port or as an outlet port. Manifold 110 is formed as a connectable modular piece such that fluid flow from an outlet port of one manifold may be connected to the inlet port of a second manifold. The present invention further contemplates that ports 140 and 142 are defined on a planar face of valve body 112 so as to provide easy access to a user.

Figure 5:
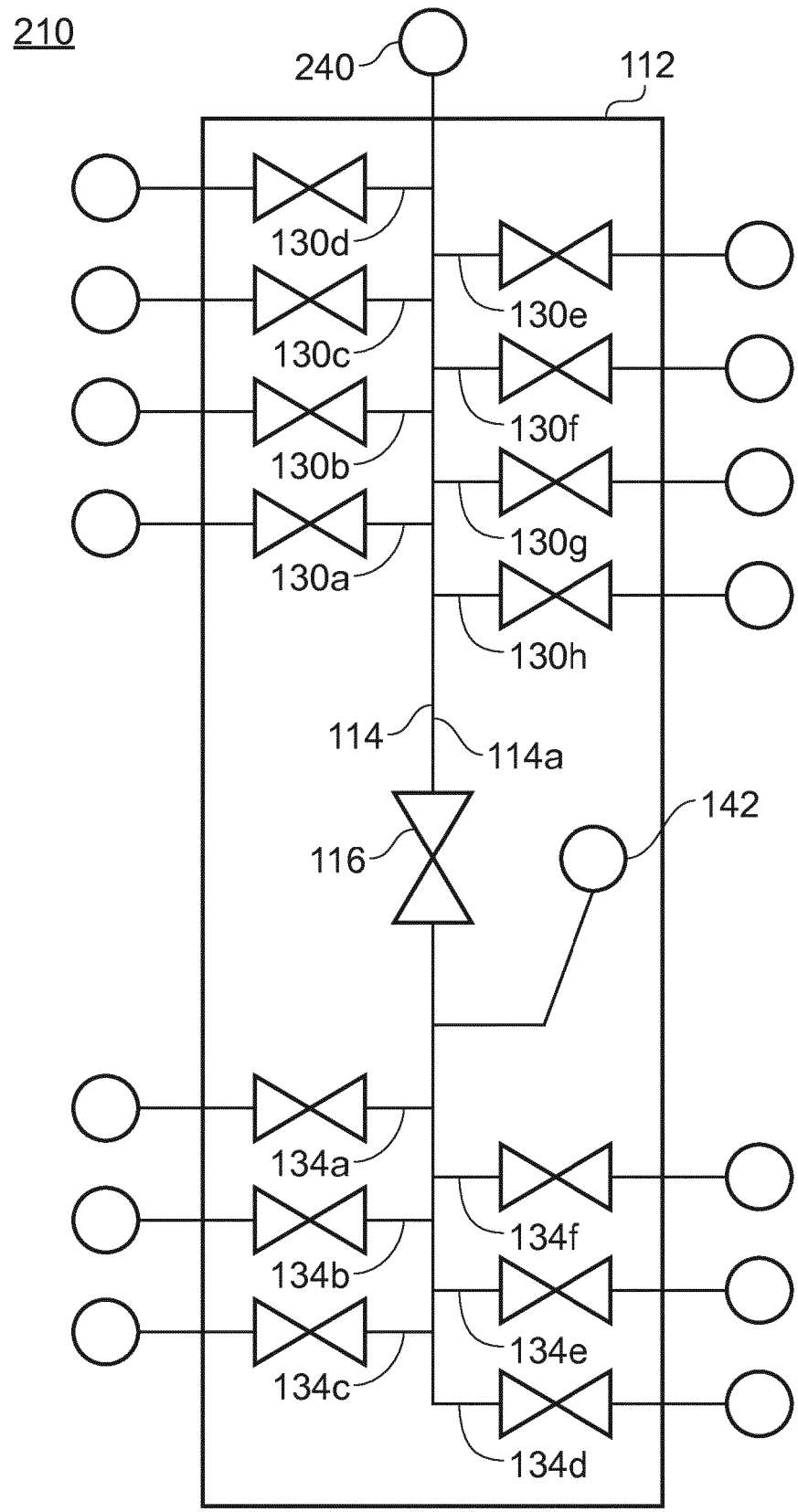
FIG. 5 depicts a second manifold of the present invention.

Alternatively, and with reference to FIG. 5, the present invention further contemplates that manifold 110 may be formed as manifold 210 which is identical in each respect to manifold 110 except that first inlet 140 is defined to be in fluid communication with central duct 114 at a location opposite branch ducts 130*a-h* from central valve 116. That is, manifold 210 includes all of the elements of manifold 110, except that manifold 210 does not include first port 140 but includes a first port 240 in fluid communication with portion 114*a* of duct 114 at a location beyond branch ducts 130*a-h* from valve 116. The present invention further contemplates that either first port 140 or second port 142 may be provided on the far side of one plurality of branch ducts from central valve 116 while the other port is provided between the other plurality of branch ducts and central valve 116. Second port is shown to open on the planar face of valve body 112.

A desirable type of valve, for central valve 116 as well as closable branch valves 132*a-h* and 136*a-d*, is a diaphragm valve. This type of valve has a simple geometry and optimally designed wet surfaces which makes it desirable for use in chromatographic processes for biopharmaceutical products, which has a very high requirement on sanitary parts. In this respect, the term "optimally designed" refers to a condition that there is a minimum of dead space and complex geometry at each valve which is cumbersome in view of sanitary requirements. However, the invention is not limited to such valves but could incorporate other valves with acceptable sanitary characteristics.

In one aspect of the invention, the manifold body 112, as well as any manifold body of the present invention, may be formed from overlying substrates which between them define the ducts of the network of flowpaths, provide deflectable membranes over portions of the flowpaths so as to either prevent or allow fluid flow therethrough, and actuator ports which allow an actuating mechanism (either mechanical, hydraulic, or pneumatic) to act upon the membranes. Additionally, manifold body 112 defines the ports for conducting fluids through manifold 110 as well as for providing the necessary connectors for connecting manifold 110 to equipment such as the pumps used provide motive force to a product fluid, the columns used with the product fluid, and any vials or receptacle for providing or withdrawing fluid from manifold 110.

Alternatively, it is contemplated that the diaphragm can be provided by a separate construction part. The diaphragm may be formed from a flexible membrane that can close or open the connections between, eg, the first and second ports 140 and 142 and between central duct 114 and the branch ducts. The actuators that press or release the membranes can be of any kind. Commonly used actuators operate on electromagnetic force or pneumatic pressure. First and second ports 140 and 142, and their similarly-numbered counterparts in each embodiment of the instant invention will alternatively be called an inlet port or an outlet port to confer that a connection is made from that port to the respective inlet port or outlet port of a separations column. Thus, throughout this description, the term "inlet port", "outlet port", or "inlet or outlet port" will refer to the first and second ports for that manifold. Each of the inlet ports and outlet ports of the instant invention are desirably defined by a major surface of the manifold body, while the connector ports are desirably formed to open on opposed transverse-surfaces, or edge surfaces, of the manifold body. The transverse, or edge surfaces, or desirably formed to perimetricly bound and extend between opposed planar major surfaces of the manifold body.

Figure 11:
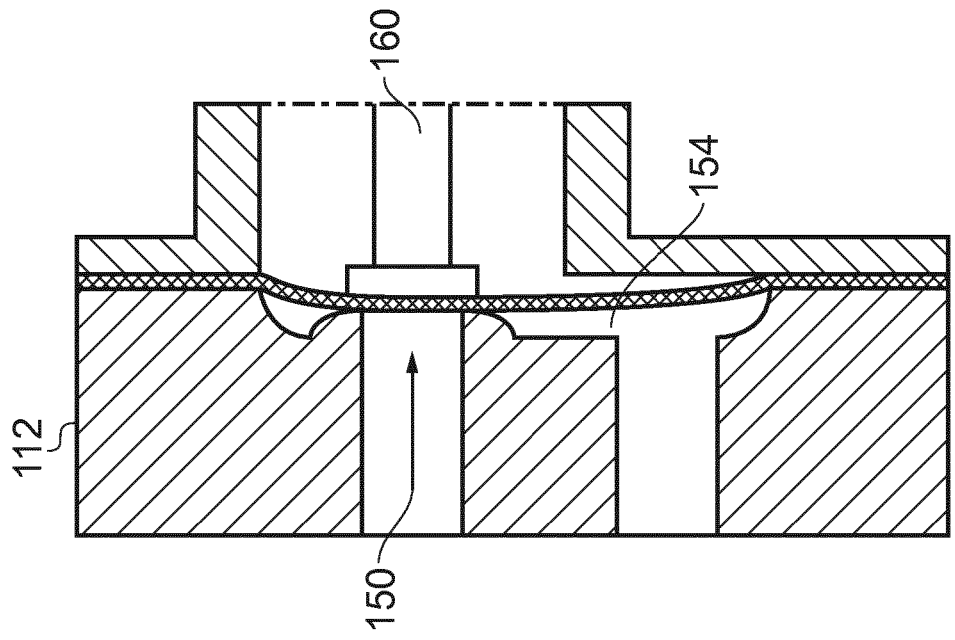
FIG. 11 depicts the membrane of FIG. 10 in a closed configuration, preventing fluid flow through the valve.
Figure 10:
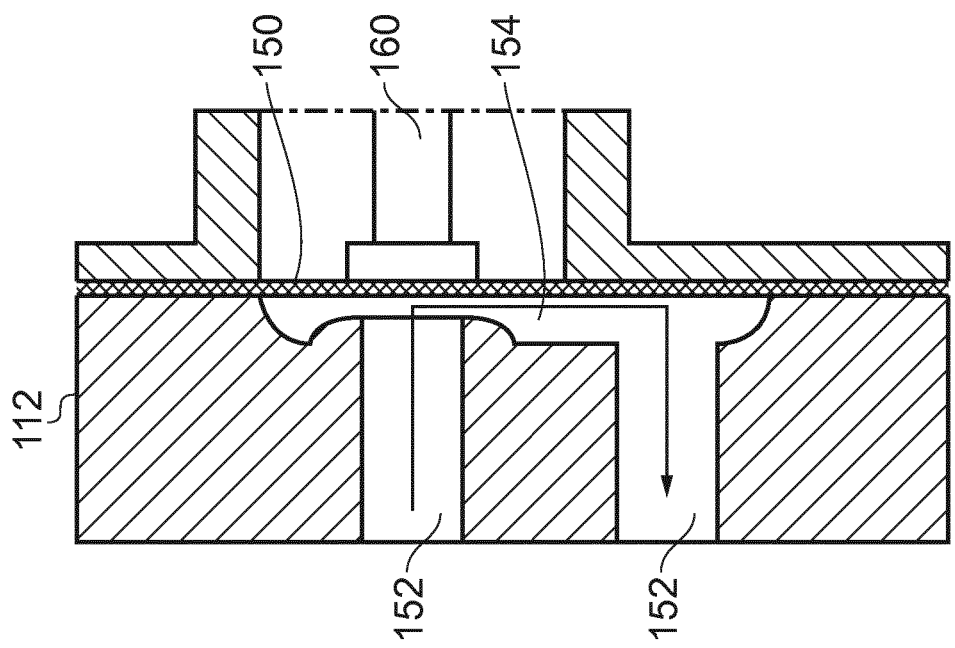
FIG. 10 depicts a membrane valve used in the present invention in an open configuration, allowing fluid flow through the valve.

FIGS. 10 and 11 depict in more detail the construction of a valve membrane 150 according to the invention. In FIG. 10, the valve is shown in an open position, and in FIG. 11 the valve is shown in a closed position. Here, manifold body 112 is shown to define through-holes 152 which are in fluid communication with the branch ducts (not shown) and central duct (not shown). The through-holes 152 are formed in a pocket 154 which is covered by a flexible fluid-impervious membrane 150. By pressing the membrane 150 in the pocket 154, the flow through the through hole is stopped and the valve is closed.

In case the first part does not already include a diaphragm that can close or open the connections between the system in—or outlets and the column in—or outlets in this part of the manifold 1, the manifold 110 may comprise a third part which comprises or which carries the diaphragm 150.

It is contemplated that each of the diaphragm valves each may have its own actuator 160 and may each be individually controlled.

Figure 6:
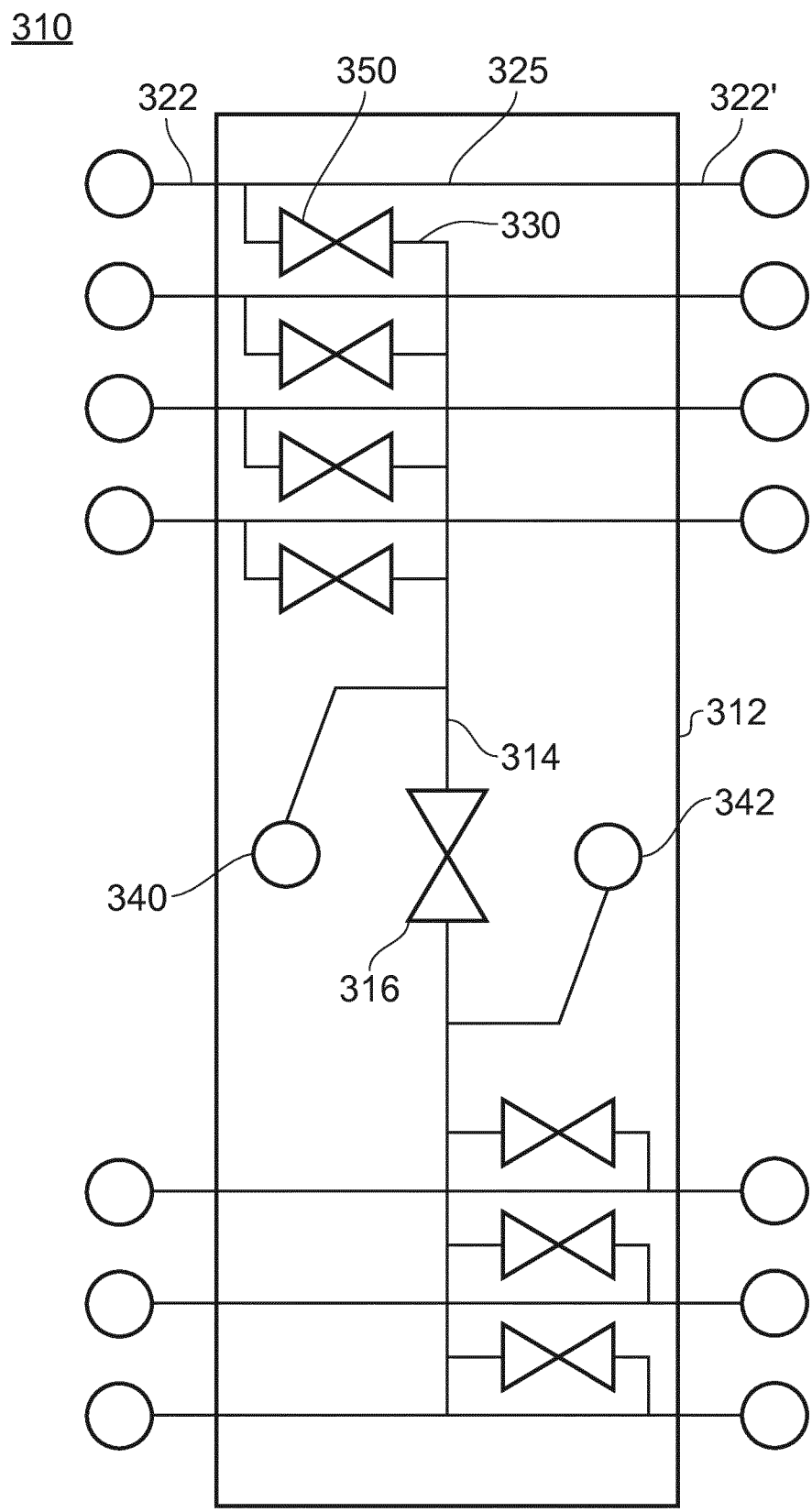
FIG. 6 depicts a third manifold of the present invention.

In yet another embodiment of the present invention, as shown in FIG. 6, a manifold 310 of the same general design as previously described but including a number of associated pairs of connector ports, 322 and 322', which are placed in direct fluid communication with each other by a through-duct 325 defined to extend through manifold body 312, passing below (or above) the central duct 314. In such an embodiment, a single branch duct 330 and access valve 350 provides selectable fluid communication for both connector ports 322 and 322' with central duct 314. This allows connecting manifolds to each other without a separate distributor. Manifold 310 may be formed, by way of illustration and not of limitation, by multiple substrates which define different portions of the fluidpath through the manifold body 312. For example, a top and bottom substrate may be solid except for valve apertures which are defined to be in overlying registry with a respective branch duct 330 and where a membrane will be provided to form a branch valve 350, as well as an aperture in overlying registry with the membrane, forming a central valve 316. For example, the bottom substrate may define the valve aperture while the top substrate defines first and second ports 340 and 342. Internal substrates may thus define different portions of the fluidpath extending between or from each of the access valves 350, including, for example, oppositely-facing connector ports 322 and 322', central duct 314, and the branch ducts 330.

As will be described hereinbelow, the present invention contemplates that the connector ports 322 and 322' of a single manifold may be placed in fluid communication with the connector ports 322' and 322, respectively, of a similarly formed manifold 310. Each of the access valves 350 will thus dictate whether a fluid flowing through one of the connector ports is able to also flow into the central duct of that manifold.

Figure 7:
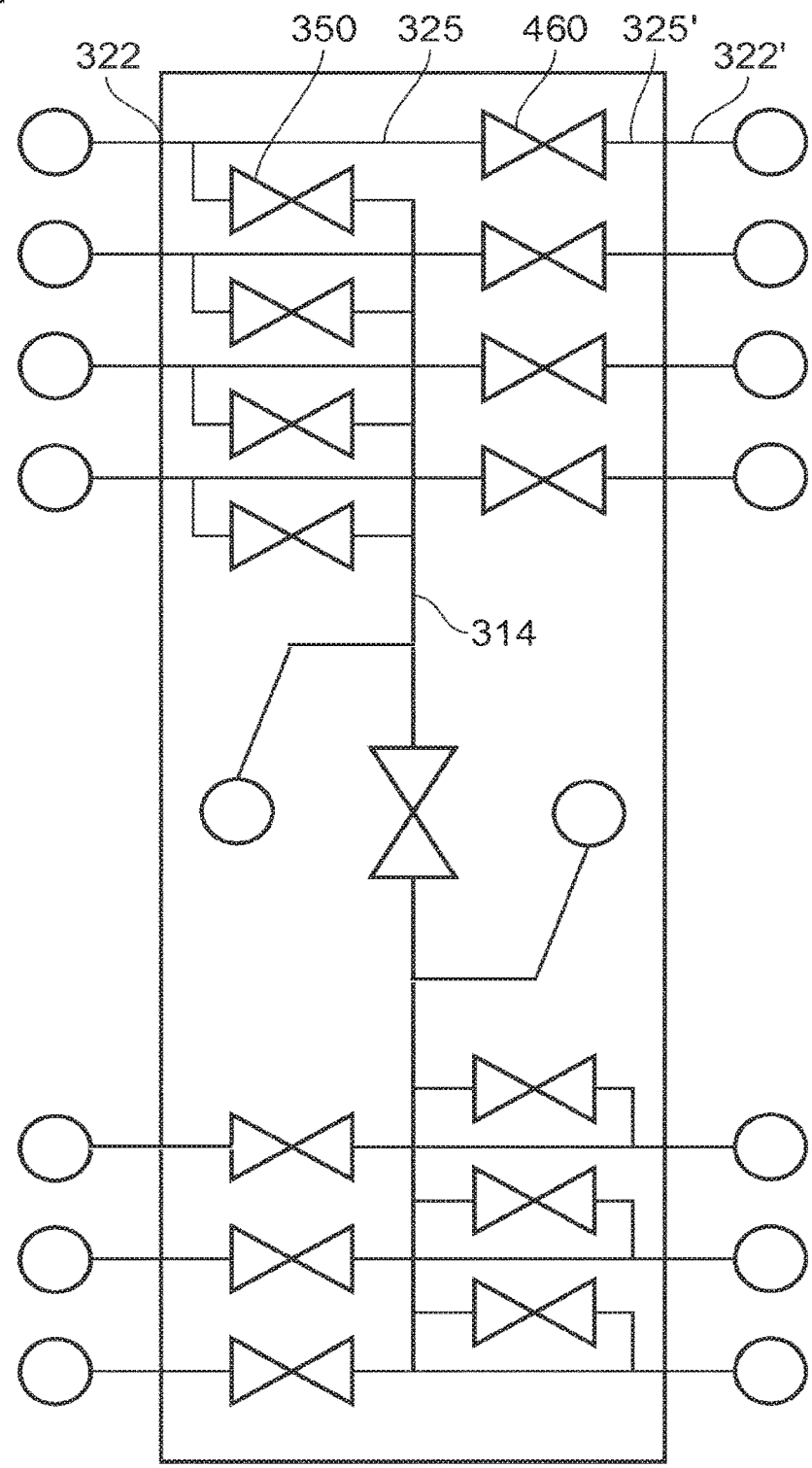
FIG. 7 depicts a fourth manifold of the present invention.

FIG. 7 depicts another manifold 410 of the present invention. Manifold 410 is formed similarly to manifold 310, so like numbering represents like features, while also providing a branch valve 460 operating on a portion of each branch duct 325 so as to dictate whether a fluid may flow from one manifold to another through the aligned branch ducts 330. Thus, for each branch duct 330, valves 350 and 460 will cooperatively open and close so as to direct a fluid flow entering the branch duct 330 through one connector port 322, 322' to one, both, or neither of the other connector port 322', 322, respectively, and central duct 314. An array formed from multiple manifolds 410 connected together may thus minimize the amount of dead space in the array by preventing fluid flow into unnecessary portions of the fluidpath provided by the adjacent manifolds. Such an array will also be shown to provide for feedback loops for the fluid flow.

Figure 8:
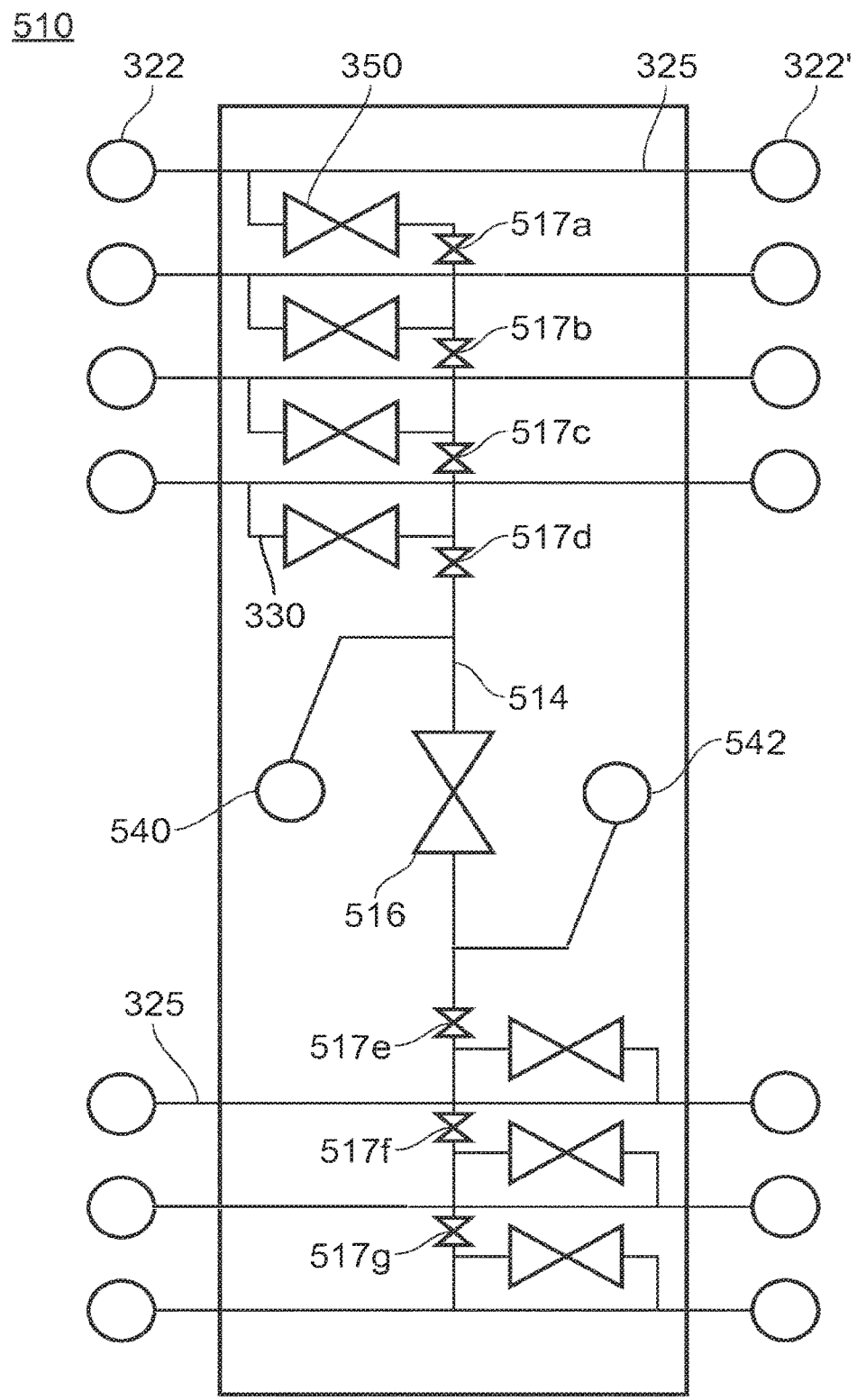
FIG. 8 depicts a fifth manifold of the present invention, providing an array valves on the central duct between adjacent branch ducts.

FIG. 8 depicts still another manifold 510 of the present invention. Manifold 510 is formed to be similar to manifold 310 except that central duct 514 includes a plurality of central duct-segment valves 517a-g arranged along central duct 514 at locations between adjacent branch ducts 330, while duct-segment valves 517d and 517e are positioned between an adjacent branch duct 330 and a respective port 540 and 542. In FIG. 8, ports 540 and 542 are shown to be positioned on opposite sides of a central valve 516, while this embodiment also is contemplated to provide one of ports 540 and 542 the far side of a respective plurality of branch ducts as was shown in FIG. 5 for manifold 210.

Figure 9:
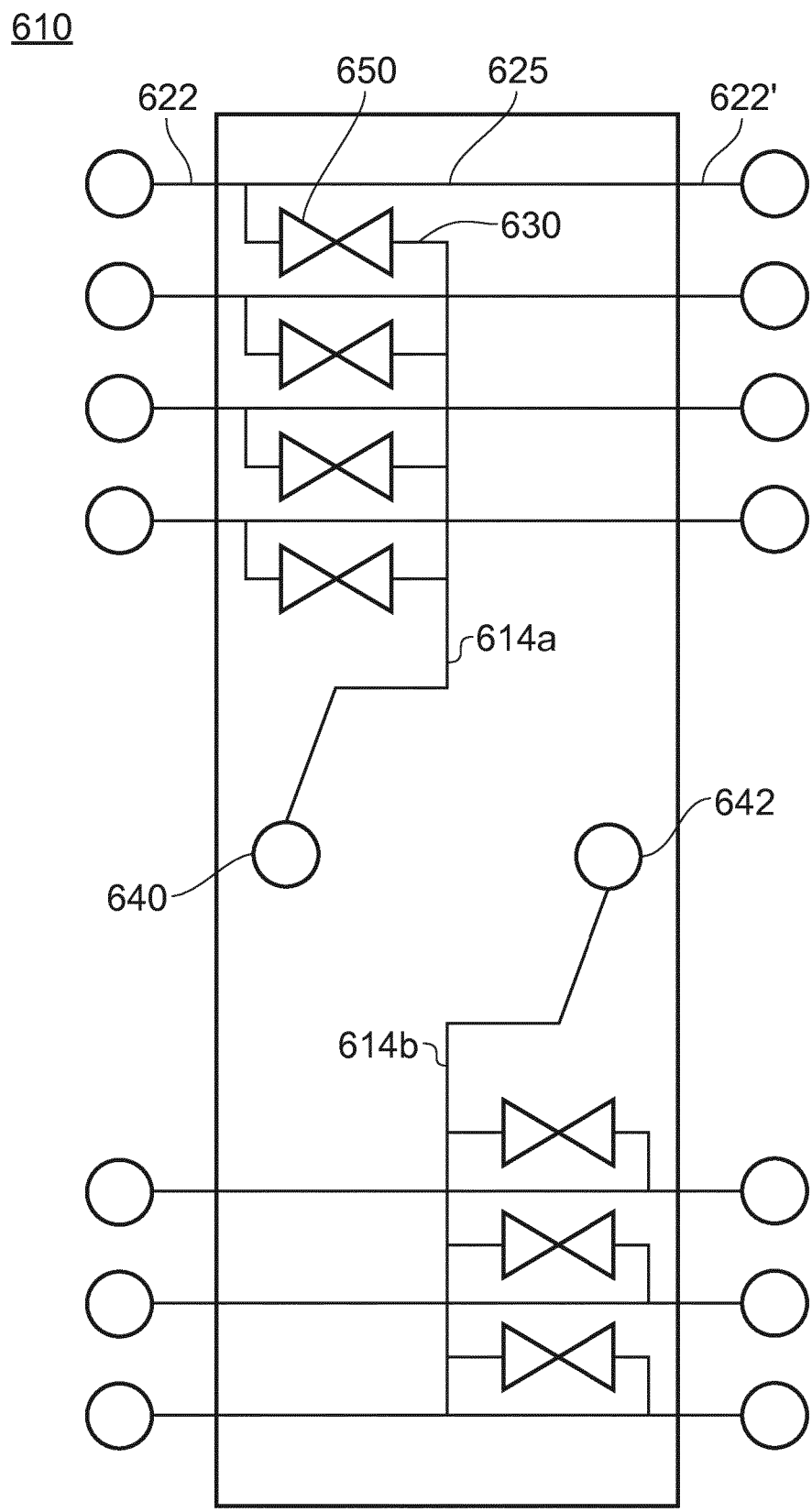
FIG. 9 depicts a sixth manifold of the present invention, having no central valve.

While the present invention has shown each manifold as providing a central valve along the central duct, the present invention further contemplates that each manifold may be provided without a central valve, and thus two central duct segments, each central duct segment being in fluid communication with one of the first and second ports, as well as in selectable fluid communication with a single plurality of branch ducts. Such an embodiment would operate similarly to the other manifolds, eg, manifolds 110, 210, 310, 410 and 510, with each of the central valves maintained in a closed configuration which prevents fluid communication between the segments of each central duct. FIG. 9 depicts a manifold 610 of the present invention, which is formed to be identical to manifold 310, but without a central valve. Manifold 610 thus provides first and second central duct portions 614a and 614b, with like numbering to manifold 310 representing like components, in fluid isolation from each other. Each of central duct portions 614a and 614b terminate at fluid port, 640 and 642, respectively. It is contemplated that fluid port 640 is connectable to be in fluid communication, for example, with the inlet port of a separations column while fluid port 642 is connectable to be in fluid communication with the outlet port of the same or a different separations column. Manifold 610 includes access valves 650 operating on a portion of each branch duct 630 so as to dictate whether a fluid may flow from a branch duct 625 into its respective central duct portion 614a or 614b. An array formed from multiple manifold 610's connected together may also minimize the amount of dead space in the array by preventing fluid flow into unnecessary portions of the fluidpath provided by the manifolds.

Each of the system inlet and outlet ports is designed to be connectable a corresponding inlet or outlet port on another manifold valve, to a corresponding port on a separations column, or even to another type of device such as a source of fluid. Any connection between two subsequent manifolds can be done by sanitary couplings between the different inlet and outlet ports, for instance through tri-clover connections. In that case, every system inlet and outlet requires one clamp between two adjacent manifolds.

The present invention contemplates that gaskets may be provided at each port of manifold 110. Alternatively, the connection at each port may be provided in a fluid-tight manner as is known in the art. Where it is desirable to have a connector port in one manifold align with a corresponding connector port in another manifold, a pocket for the gasket can be molded in the exposed surfaces of the manifold in such a way that these gaskets ensure leak-tight connections between the adjacent manifolds. In this case, the manifolds should be tightly pressed together by some means such as a press. Yet another alternative is that the gaskets of all connections are combined in one layer that should be put in between two adjacent manifolds. In such a case, the manifolds may be equipped with a fitting to ensure proper positioning of the gasket.

Figure 12:
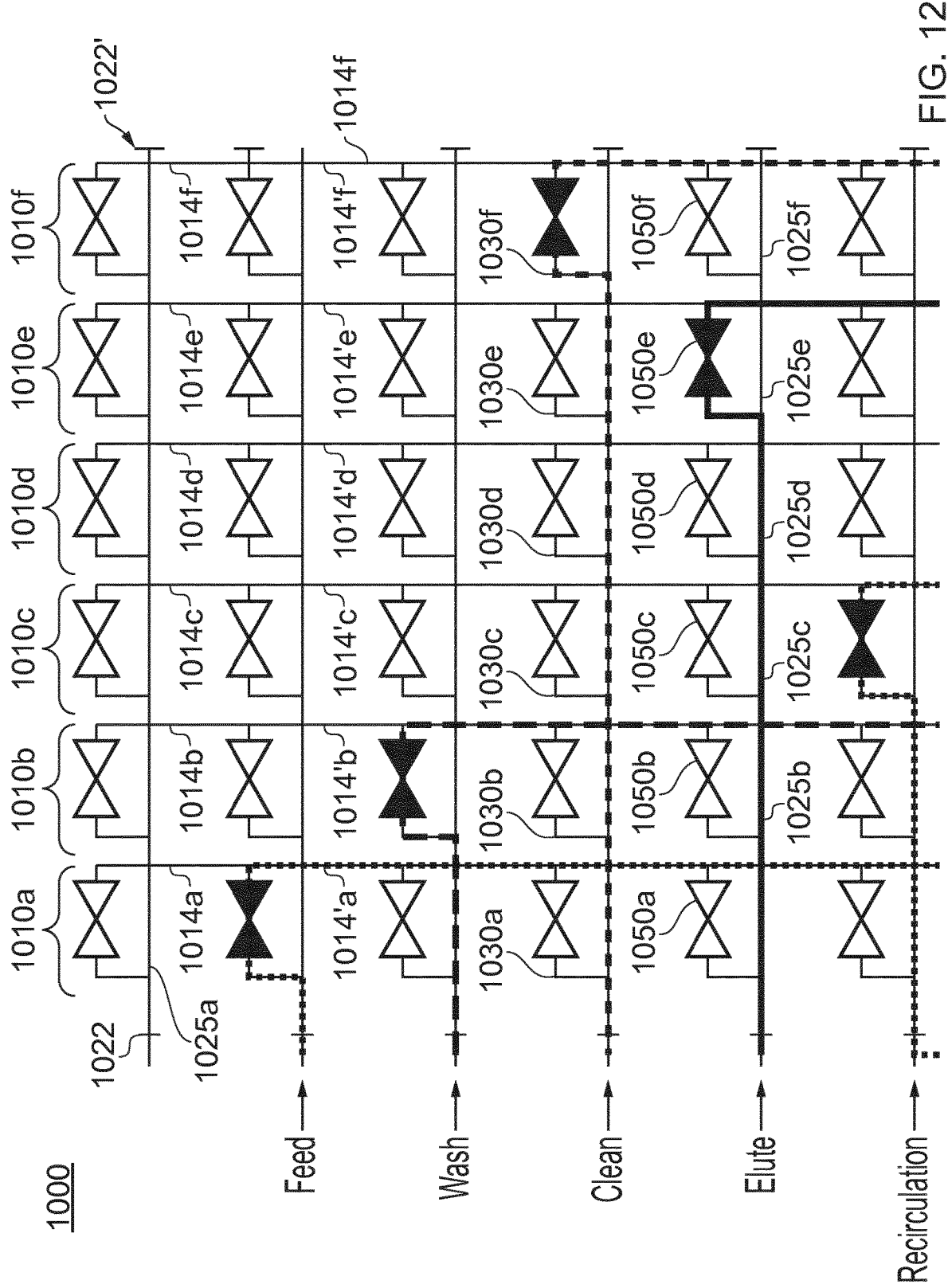
FIG. 12 depicts an SMB chromatography system utilizing six manifolds of the present invention.
Figure 12:
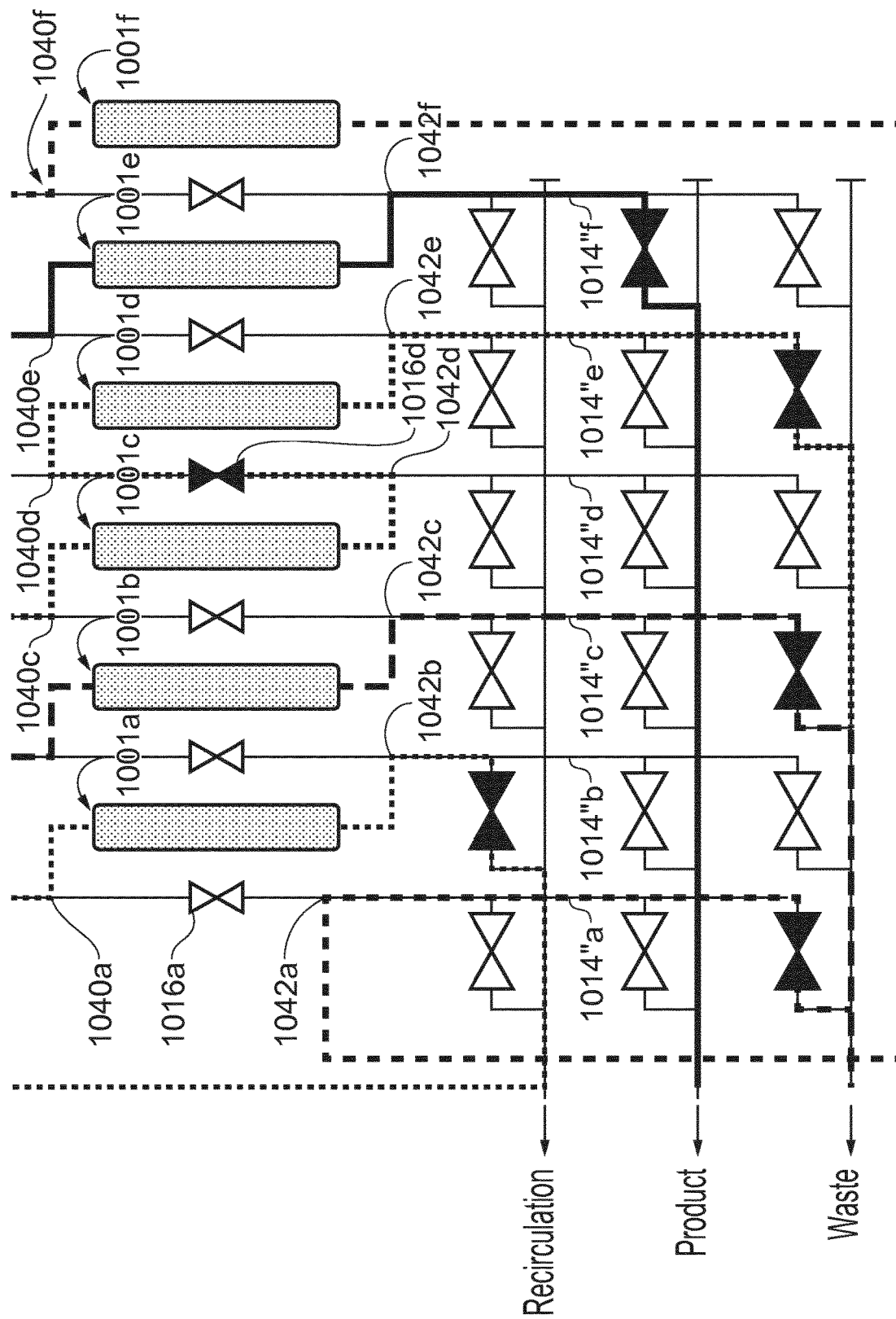
Figure 13:
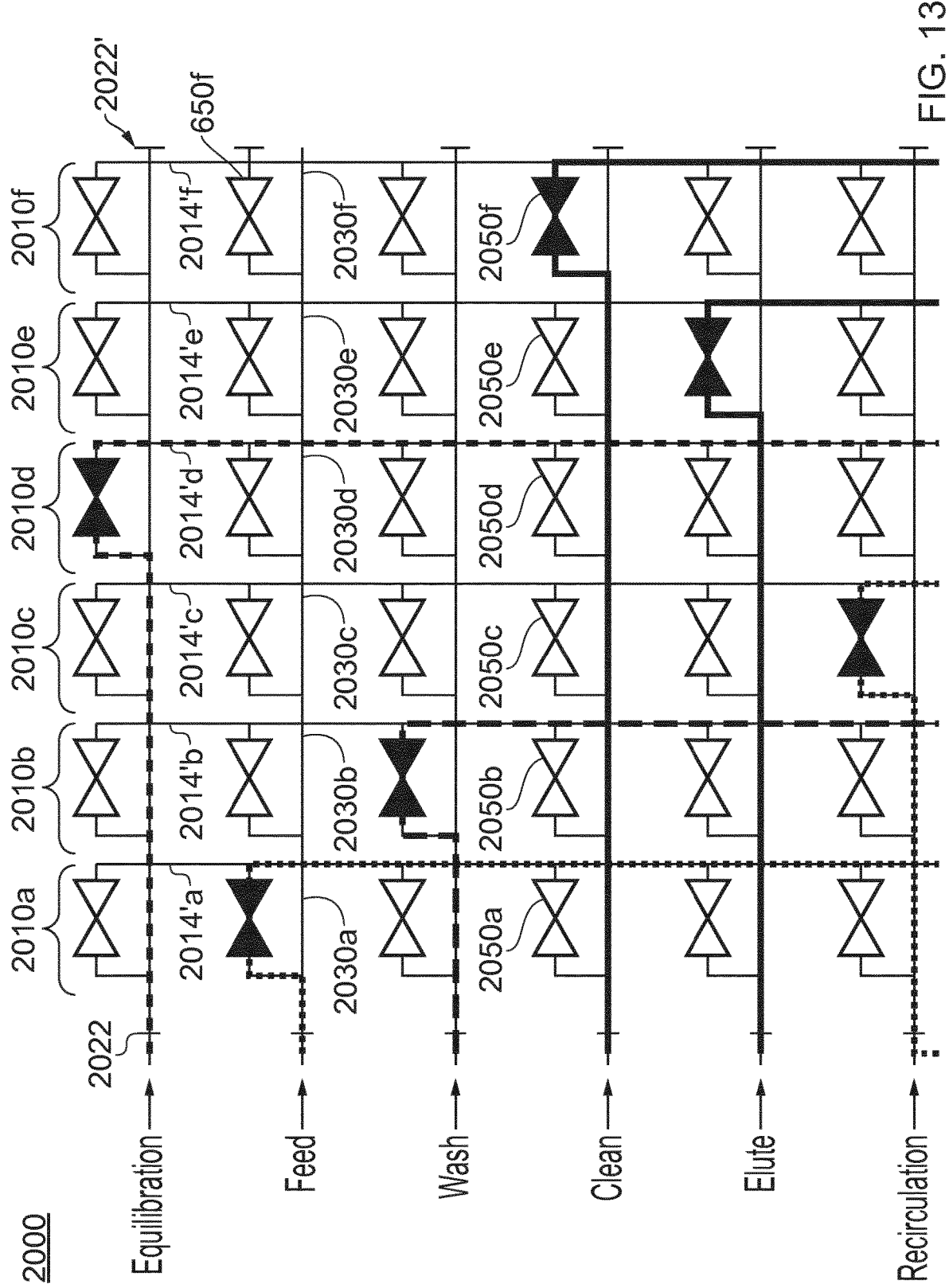
FIG. 13 depicts an SMB chromatography system utilizing another six manifolds of the present invention.
Figure 13:
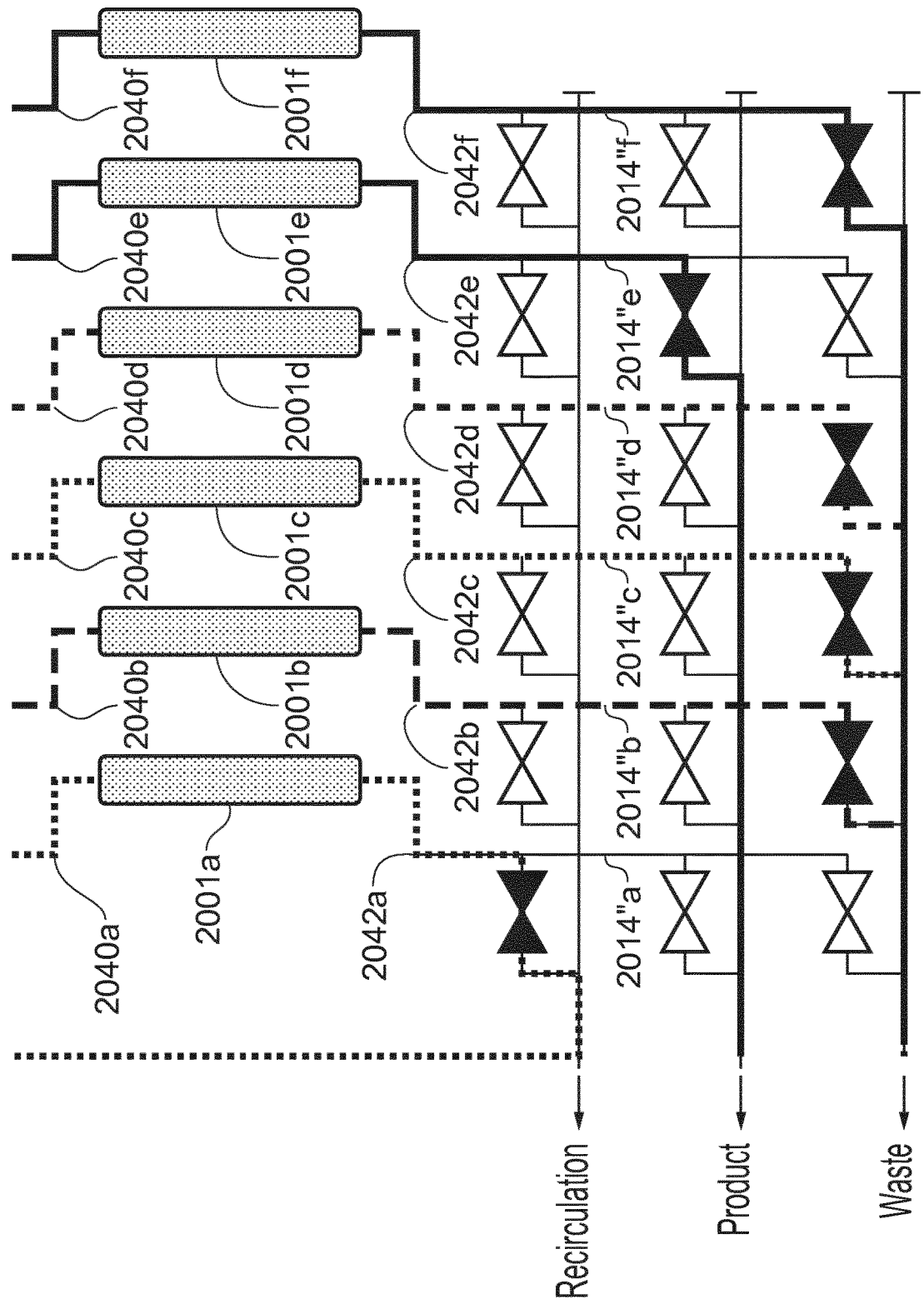
Figure 14:
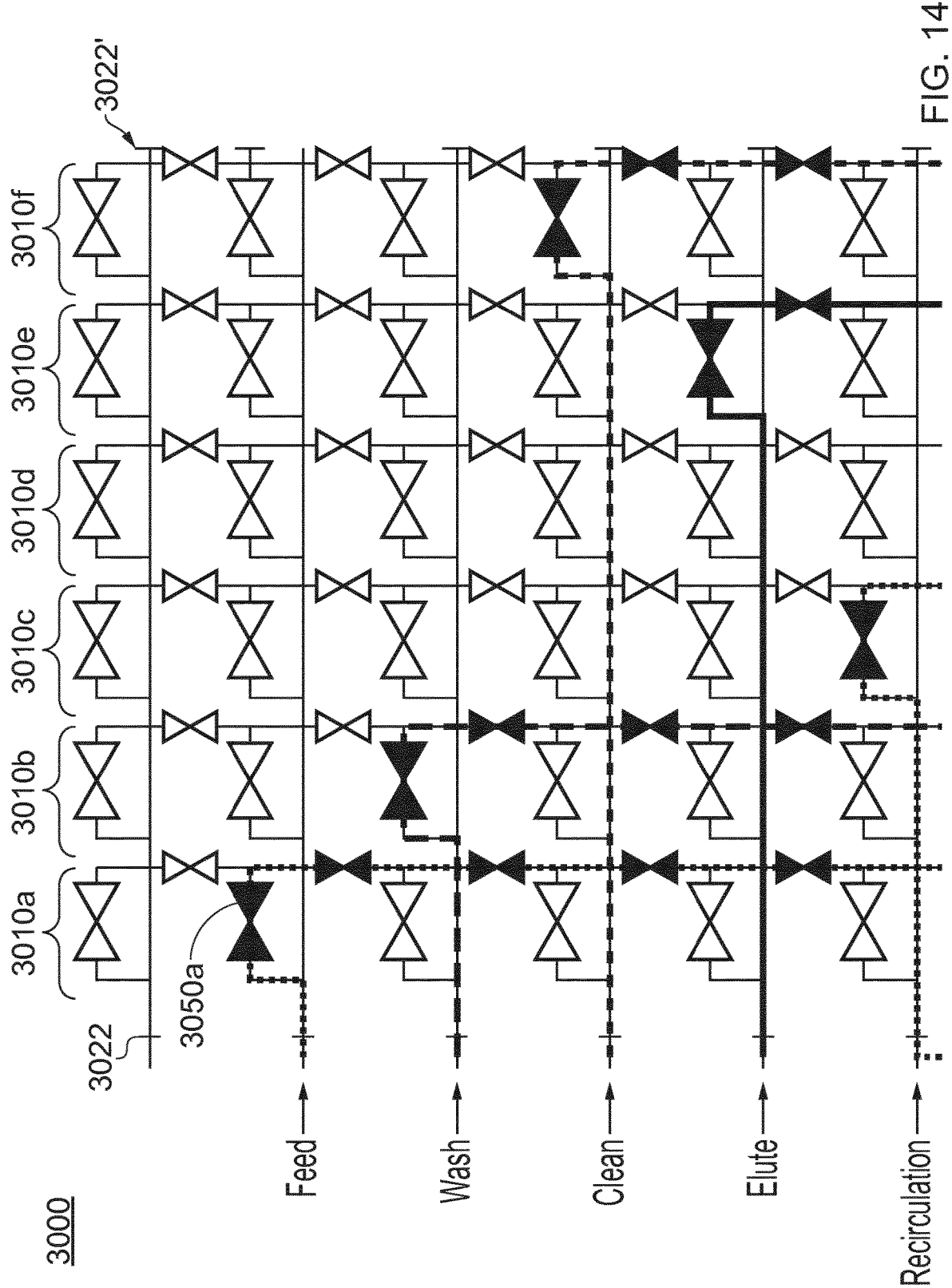
FIG. 14 depicts an SMB chromatography system utilizing yet another six manifolds of the present invention.

FIGS. 12-14 depict different SMB chromatography systems employing valve manifolds of the instant invention. In each system, multiple valve manifolds are provided with corresponding connector ports provided in fluid communication with the respective connector port of the adjacent valve manifold. For each of the systems in FIGS. 12-14, a state of a process for using the system is described with reference to certain valves—colored in black—being open to allow fluid flow therethrough and the other valves—colored in white—being closed so as to preclude fluid flow therethrough. For example in FIG. 12, central duct valve 1016a is shown as being closed (ie, in white) while central duct valve 1016d is shown as being open (ie, in black) so as to allow fluid flow therethrough.

For example, FIG. 12 depicts an SMB chromatography system 1000 incorporating six valve manifolds 1010a-f of the present invention. For purposes of this discussion, each valve manifold 1010 is formed to be similar to valve manifold 310 except that each manifold 1010a-f includes a first plurality of branch ducts providing six branch ducts 1025 extending in fluid communication between opposed connector ports 1022 and 1022', each branch duct being in selectable fluid communication, via an access valve 1050, with a central duct segment extending from a central valve 1016. Additionally, the second connector ports 1022' of valve manifold 1010f are all desirably sealed closed such that fluid may only flow between the first connector ports 1022 and central duct 1014f through a respective access valve. Columns 1001a-g are connected to manifolds 1010a-g, with an inlet port of each column being connected to first port 1040 of an associated valve manifold while the outlet ports of each column are connected to the second port 1042 of an adjacent valve manifold, with the outlet port of column 1001g is connected to second port 1042a of valve manifold 1010a. For simplicity, each through duct 1025, branch duct 1030, access valve 1050, etc, for each manifold 1010a-g will have the same identification number for a given manifold. Operation of each component will be clear to those of ordinary skill in the art, given the example operations described herein.

Following the dotted line marked "Feed" in FIG. 12, a source of feed fluid is connected to a first connector port of the first plurality of branch ducts, a feed fluid is allowed to flow through central duct 1014a of valve manifold 1010a to first port 1040a there it then flows through column 1001a. From column 1001a, the fluid flows into second port 1042b of valve manifold 1010b to the central duct 1014b of valve manifold 1010b and through a pair of aligned branch ducts of the second plurality of branch ducts in both valve manifolds 1010b and 1010a. From a connector port of the second plurality of branch ducts on valve manifold 101a, a connecting conduit (denoted by "Recirculation") directs the fluid into a connector port in the first plurality of branch ducts on valve manifold 1010a. The fluid then flows through the aligned branch ducts of valve manifolds 1010a and 1010b to valve manifold 1010c, the the fluid is then directed through the branch valve to central duct 1014c to first port 1040c to column 1001c. From column 1001c the fluid is directed to the second port 1042d of valve manifold 1010d, through central valve 1016d to first port 1040d and then into column 1001d. From column 1001d the fluid is directed to second port 1042e of valve manifold 1010e and through second central duct segment 1014b to a series of aligned branch ducts of the second plurality of branch ducts out a connector port of first valve manifold 101a to a waste collection container.

Simultaneously, while the above is occurring for the feed fluid flow through columns 1001a, 1001c, and 1001d, system 1000 is able to direct a wash fluid through column 1001b, the discharge of which is directed to waste, a clean fluid through column 1001f, the discharge of which is directed to waste, and an elution fluid is directed through column 1001e, the output of which is collected as product.

The wash fluid, depicted by long-dashed line segments, is directed to central duct 1014b to first port 1040b of valve manifold 1010b, then to column 1001b, from where the fluid is directed to second port 1042c of valve manifold 1010c and into second segment of central duct 1014c of valve manifold 1010c and through aligned branch segments of valve manifolds 1010b and 1010a to waste. Clean fluid, depicted by short-dashed line segments, is directed central duct 1014f of valve manifold 1010f and through first port 1040f to column 1001f, from where it is directed to second port 1042a of valve manifold 1010a and down the second segment of central duct 1014a through the furthest branch valve of the second plurality of branch ducts to the waste branch ducts. Elution fluid, depicted by a solid thick line, is directed to central duct 1014e of valve manifold 1010e, out first port 1040e to column 1001e, to second port 1040f of valve manifold 1010f, through the second segment of central duct 1014f, through a branch valve to aligned branch ducts to be collected as product fluid. While all fluid is said to flow through a column, it is contemplated that each fluid is changed by its interaction at a column, thereby classifying it as a product, waste, or recirculation fluid, even though it has been described as the same fluid flowing into and out of each column Thus, each of the columns may be individually or in groups selected for feeding, washing, cleaning, or eluting. It will be apparent to those of ordinary skill in the art how the valves may be reset to provide a fluid with the desired flowpath through system 1000.

FIG. 13 depicts an SMB chromatography system 2000 incorporating six valve manifolds 2010a-f of the present invention. For purposes of this discussion, each valve manifold 2010 is formed to be similar to valve manifold 610 (having no central duct valve and thus providing two separate central duct portions similar to 614a and 614b, but each portion here designated, eg, as 2014'a and 2014"a for the two portions of manifold 2010a) except that the first plurality of branch ducts provides six through ducts extending in fluid communication between opposed connector ports, each branch duct being in selectable fluid communication with a first central duct segment, or portion, extending from a central valve. Additionally, the second connector ports 2022' of valve manifold 2010f are all desirably sealed closed such that fluid may only flow between the first connector ports 2022 and central duct portions 2014'f and 2014"f through a respective access valve 650f. Columns 2001a-g are connected to each of manifolds 2010a-2010f, respectively, with an inlet port of each column being connected in fluid communication to first port 2040 of an associated valve manifold while the outlet ports of each column are connected in fluid communication to the second port 2042 of the same valve manifold.

Following the dotted line marked "Feed" in FIG. 13, a source of feed fluid is connected to a first connector port of the first plurality of branch ducts, a feed fluid is allowed to flow through central duct portion 2014'a of valve manifold 2010a to first port 2040a where it then flows through column 2001a. From column 2001a, the fluid flows into second port 2042b of valve manifold 2010a to the central duct portion 2014"a of valve manifold 2010a and through a through-duct of the second plurality of branch ducts in valve manifold 2010a. From a connector port of the second plurality of branch ducts on valve manifold 2010a, a connecting conduit (denoted by "Recirculation") directs the fluid into a connector port in the first plurality of branch ducts on valve manifold 2010a. The fluid then flows through the aligned branch ducts of valve manifolds 2010a and 2010b to valve manifold 2010c, there the fluid is then directed through the access valve 2050c to central duct portion 2014'c to first port 2040c to column 2001c. From column 2001c the fluid is directed to the second port 2042c of valve manifold 2010c, to second port 2042c and then through central duct portion 2014"c to the last through-duct which it flows through manifolds 2010b and 2010a to a waste collection container or conduit.

Simultaneously, while the above is occurring for the feed fluid flow through columns 2001a and 2001c, system 2000 is able to direct a wash fluid through central duct portion 2014'b to first port 2040b to column 2001b, the discharge of which is directed through second port 2042b to waste through central duct portion 2014"b. A clean fluid through column 2001f, the discharge of which is directed to waste, and an elution fluid is directed through column 2001e, the output of which is collected as product. The wash fluid, depicted by long-dashed line segments, is directed to central duct portion 2014'b to first port 2040b of valve manifold 2010b, then to column 2001b, from where the fluid is directed to second port 2042b of valve manifold 2010b and into central duct portion 2014"b and through aligned branch segments of valve manifolds 2010b and 2010a to waste. Clean fluid, depicted by short-dashed line segments, is directed to central duct portion 2014'f of valve manifold 2010f and through first port 2040f to column 2001f, from where it is directed to second port 2042f of valve manifold 2010f and down the central duct portion 2014"f through the furthest branch valve of the second plurality of branch ducts to the waste branch ducts. Elution fluid, depicted by a solid thick line, is directed to central duct 2014e of valve manifold 2010e, out first port 2040e to column 2001e, to second port 2040e of valve manifold 2010e, through the central duct portion 2014"e, through a branch valve to aligned branch ducts to be collected as product fluid. Additionally, an Equilibriaton fluid may be directed to the central duct portion 2014'd of manifold 2010d through first port 2040d to column 2001d and then to port 2042d to central duct portion 2014"d to waste. Each fluid is contemplated to be changed by its interaction at a column, thereby classifying it as a product, waste, or recirculation fluid. Thus, each of the columns may be individually or in groups selected for feeding, washing, cleaning, or eluting. It will be apparent to those of ordinary skill in the art how the valves may be reset to provide a fluid with the desired flowpath through system 2000.

FIG. 14 depicts an SMB chromatography system 3000 incorporating six valve manifolds 3010a-f of the present invention. For purposes of this discussion, each valve manifold 3010 is formed to be similar to valve manifold 510 except that the first plurality of branch ducts provides six branch ducts extending in fluid communication between opposed connector ports, each branch duct being in selectable fluid communication with a first central duct segment, or portion, extending from a central valve. Additionally, the second connector ports 3022' of valve manifold 3010f are all desirably sealed closed such that fluid may only flow between the first connector ports 3022 and central duct 3014f through a respective access valve 3050f. Columns 3001a-g are connected to manifolds 3010a-g, with an inlet port of each column being connected to first port 3040 of an associated valve manifold while the outlet ports of each column are connected to the second port 3042 of an adjacent valve manifold, with the outlet port of column 3001g is connected to second port 3042a of valve manifold 3010a.

Following the dotted line marked "Feed" in FIG. 13, a source of feed fluid is connected to a first connector port of the first plurality of branch ducts, the feed fluid is allowed to flow through central duct 3014a of valve manifold 3010a to first port 3040a there it then flows through column 3001a. From column 3001a, the fluid flows into second port 3042b of valve manifold 3010b to the central duct 3014b of valve manifold 3010b and through a pair of aligned branch ducts of the second plurality of branch ducts in both valve manifolds 3010b and 3010a. From a connector port of the second plurality of branch ducts on valve manifold 3010a, a connecting conduit (denoted by "Recirculation") directs the fluid into a connector port in the first plurality of branch ducts on valve manifold 3010a. The fluid then flows through the aligned branch ducts of valve manifolds 3010a and 3010b to valve manifold 3010c, the the fluid is then directed through the branch valve to central duct 3014c to first port 3040c to column 3001c. From column 3001c the fluid is directed to the second port 3042d of valve manifold 3010d, through central valve 3016d to first port 3040d and then into column 3001d. From column 3001d the fluid is directed to second port 3042e of valve manifold 3010e and through second central duct segment 3014b to a series of aligned branch ducts of the second plurality of branch ducts out a connector port of first valve manifold 3010a to a waste collection container.

Simultaneously, while the above is occurring for the feed fluid flow through columns 3001a, 3001c, and 3001d, system 3000 is able to direct a wash fluid through column 3001b, the discharge of which is directed to waste, a clean fluid through column 3001f, the discharge of which is directed to waste, and an elution fluid is directed through column 3001e, the output of which is collected as product. The wash fluid, depicted by long-dashed line segments, is directed to central duct 3014b to first port 3040b of valve manifold 3010b, then to column 3001b, from where the fluid is directed to second port 3042c of valve manifold 3010c and into second segment of central duct 3014c of valve manifold 3010c and through aligned branch segments of valve manifolds 3010b and 3010a to waste. Clean fluid, depicted by short-dashed line segments, is directed central duct 3014f of valve manifold 3010f and through first port 3040f to column 3001f, from where it is directed to second port 3042a of valve manifold 3010a and down the second segment of central duct 3014a through the furthest branch valve of the second plurality of branch ducts to the waste branch ducts. Elution fluid, depicted by a solid thick line, is directed to central duct 3014e of valve manifold 3010e, out first port 3040e to column 3001e, to second port 3040f of valve manifold 3010f, through the second segment of central duct 3014f, through a branch valve to aligned branch ducts to be collected as product fluid. Each fluid is contemplated to be changed by its interaction at a column, thereby classifying it as a product, waste, or recirculation fluid.

Thus, each of the columns of system 3000 may be individually or in groups selected for feeding, washing, cleaning, or eluting. It will be apparent to those of ordinary skill in the art how the valves may be reset to provide a fluid with the desired flowpath through system 3000. It will also be noted that portions of the flowpath of system 3000, eg, the through-ducts for manifolds 3010b-g beyond the access valve 3050a for the Feed fluid in FIG. 14 will fill with the Feed fluid in this example and such portions of the through-ducts will be dead space for system 3000. By employing a plurality of manifolds 410 in system 3000, the amount of dead space can be further reduced by closing the branch duct valve (460) in the at the position of manifold 3010b so as to prevent Feed fluid from flowing across to manifolds 3010c-

3010f. A system employing a number of manifolds 410 may thus further reduce deadspace thoughout the entire chromatography system.

In one aspect of the invention, the system consists of at least three columns connected to or across valve manifolds of the present invention. Each of these manifolds has at least three ports (eg, the inlet port, outlet port, or connector ports) functioning as inlets and at least two such ports functioning as outlets. This combination allows continuous a process as normally conducted in a merry-go-round system. This involves continuous feeding of at least one column, generally two columns in series in a recirculation pattern as described. The third column is washed, eluted and/or regenerated while the first and second column are being loaded. After a certain time, once the first column is saturated, the valves in the manifolds switch in such a manner that the feed solution is applied on the second column, while said first column is subjected to all other steps in the process. The third column is connected to the outlet of the second column.

In another aspect of the invention, the system comprises four to eight columns with valve manifolds connected to or across them. Each of these manifolds comprises at least three inlets and at least three outlets (again, using the inlet port, outlet port, or connector ports). This combination allows continuous fractionation processes, similar to the traditional SMB processes. Since the valves are controlled individually, the length of the different zones in the SMB process does not necessarily have to be constant during the operation and not all flow rates are necessarily constant over the entire process cycle. The system according to this aspect of the invention thus also allows more advanced operations than traditional SMB chromatography, such as the Improved SMB, Sequential SMB, Varicol or the Japan Organo mode of operation.

In yet another aspect of the invention, the system comprises eight or more columns connected to or across the valve manifolds of the present invention. Each manifold has minimal five, desirably eight inlets and minimal two, desirably four outlets. This combination allows continuous countercurrent purification of complex proteins, such as monoclonal antibodies, using ion exchange or affinity chromatography. Each of the different fluids involved is connected to one inlet of the system. The valves on the manifolds are controlled in such a way that the columns are subsequently subjected to the loading, washing, elution and all other steps involved in the process cycle. Since multiple columns can be connected in series one or more of these steps can be carried out in essentially countercurrent mode. This enables a more efficient process and may lead to significant savings in chemicals, solvents and water.

In one aspect of the invention, the system comprises multiple columns, each carrying a different Adsorbent. This allows conducting fully automated multi-step chromatographic purifications. This may or may not involve intermediate storage connected to the system outlets, which is also connected to a system inlet.

While the particular embodiment of the present invention has been shown and described, it will be apparent to those skilled in the art that changes and modifications may be made without departing from the teachings of the invention. For example, the number of branch ducts and connectors associated with each portion of the central duct may be varied without departing from the instant invention. The matter set forth in the foregoing description and accompanying figures is offered by way of illustration only and not as a limitation. The actual scope of the invention is intended to be defined in the following claims when viewed in their proper perspective based on the prior art.

What is claimed is:

1. A device for chromatographic separations comprising:
 a manifold comprising
 a manifold body defining an elongate central duct, the central duct comprising a centrally-located closable duct valve providing selective fluid communication between a first portion of the central duct and an opposed second portion of the central duct,
 a first plurality of connectors, each connector of the first plurality of connectors for connecting to a distinct chromatographic separation column and/or feed or extraction tubing or to a connector of an adjacent manifold;
 a second plurality of connectors, each connector of the second plurality of connectors for connecting to a distinct chromatographic separation column and/or feed or extraction tubing or to a connector of an adjacent manifold;
 wherein said manifold body further defines:
 a first plurality of branch ducts and through ducts, each individual branch duct extending from the first portion of the central duct to an individual one of a through duct of the first plurality of connectors, each of the branch ducts of the first plurality of branch ducts comprising a closable access valve providing selectable fluid communication between a respective connector and the first portion of the central duct,
 a second plurality of branch ducts and through ducts, each individual branch duct extending from the second portion of the central duct to an individual one of the through ducts of the second plurality of connectors, each of the branch ducts of the second plurality of branch ducts comprising a closable access valve providing selectable fluid communication between a respective connector and the second portion of the central duct;
 first and second ports in fluid communication with the centrally-located closable duct valve wherein said first port communicates with said first portion of the central duct and said second port communicates with said second portion of said central duct, wherein one of said first and second ports is further positioned to communicate with said central duct at a location between the centrally-located closable duct valve and the first and second plurality of branch ducts, respectively; and wherein
 a branch valve is positioned along each through duct of said first and second plurality of through ducts, the device further comprising:
 a plurality of central duct valves, wherein a first portion of the central duct valves are positioned along the first portion of the central duct between successive branch ducts of the first plurality of branch ducts and a second portion of the central duct valves are positioned along the second portion of the central duct between successive branch ducts of the second plurality of branch ducts.

2. The device according to claim 1, wherein the other of said first and second ports communicates with said central duct at a location opposite the other of the first and second branch ducts, respectively.

3. The device according to claim 1, wherein the device is formed to group said connectors and valves in a compact manifold.

4. The device according to claim 3, wherein said compact manifold is formed as a disposable item.

5. The device according to claim 1, wherein at least one of the centrally-located closable duct valve and the access valves of the first or second plurality of branch ducts comprises a membrane valve, actuated by a separate actuator.

6. The device according to claim 1, wherein the device is formed as a connectable modular piece wherein corresponding connectors of the modular piece connect to corresponding connectors on a second connectable modular piece to form a plurality of parallel coupled central ducts so that at least one coupled branch duct is connectable in fluid communication to a selectable plurality of central ducts via a selected number of access valves in said modular pieces.

7. The device according to claim 6, wherein the connectors are formed by corresponding gaskets provided on side walls of the modular piece to be pressed together by a press and providing a fluid communication between respective branch ducts and/or central ducts.

8. The device according to claim 1, wherein the manifold is formed from a plurality of overlying substrates which define a network of flowpaths through the manifold body and a plurality of through-holes for extending through said manifold body to the plurality of branch ducts, said substrates enclosing a membrane in overlying fit with the plurality of through-holes such that the membrane may be deflected between an orientation preventing flow through the respective branch duct and an orientation allowing flow through the respective branch duct.

9. The device according to claim 8, further comprising mountings for mounting a corresponding number of actuators for each of the plurality of through-holes.

10. The device according to claim 9, wherein at least one of the centrally-located closable duct valve and the access valves of the first or second plurality of branch ducts comprises a membrane valve, actuated by a separate actuator, and wherein the actuators are formed to correspond with the membrane valves.

11. The device according to claim 1, wherein the first plurality of connectors and the second plurality of connectors are formed of sanitary couplings.

12. The device according to claim 1, wherein the first and second plurality of branch ducts each comprise three to six extraction branches.

13. The device according to claim 1, wherein at least the first plurality of connectors further comprises associated pairs of connectors wherein each connector of the pairs of connectors are located opposite to each other across the central duct, such that each associated pair of connectors is in fluid communication with each other such that a single access valve controls flow between the pair of connectors and the central duct.

14. The system for providing chromatographic separations, comprising a plurality of devices of claim 1; one or more chromatographic separation columns connected to or across said plurality of devices; feeding tubing and/or extraction tubing, at least one of the feeding and/or extraction tubing connected to branch ducts and a plurality of pumps to provide a flow in any of said columns and/or extraction or feeding tubing.

15. The system of claim 14, wherein said centrally-located closable duct valves, closable access valves, and branch valves of said devices are capable of being set to provide fluid flow through a first branch duct of the first plurality of branch ducts to one portion of said central duct to the input port of a column, through said column, and into a branch duct of the second plurality of branch ducts, and through a second branch duct of the first plurality of branch ducts to the input port of a second column.

16. A method for providing biopharmaceutical products involving a chromatographic separation process, the method comprising separating biopharmaceutical products with a system according to claim 14.

\* \* \* \* \*